US011163562B2

(12) United States Patent
Bannow

(10) Patent No.: US 11,163,562 B2
(45) Date of Patent: Nov. 2, 2021

(54) PROCESSING UNIT AND OPERATING METHOD THEREFOR

(71) Applicant: Robert Bosch GmbH, Stuttgart (DE)

(72) Inventor: Nico Bannow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 67 days.

(21) Appl. No.: 16/154,852

(22) Filed: Oct. 9, 2018

(65) Prior Publication Data

US 2019/0108017 A1   Apr. 11, 2019

(30) Foreign Application Priority Data

Oct. 9, 2017   (DE) .......................... 102017217908.2

(51) Int. Cl.
*G06F 9/22*   (2006.01)
*B60W 10/06*   (2006.01)
*G06F 9/30*   (2018.01)

(52) U.S. Cl.
CPC ............. *G06F 9/223* (2013.01); *B60W 10/06* (2013.01); *G06F 9/30065* (2013.01)

(58) Field of Classification Search
None
See application file for complete search history.

(56) References Cited

U.S. PATENT DOCUMENTS

| | | | | |
|---|---|---|---|---|
| 5,699,537 A | * | 12/1997 | Sharangpani | G06F 9/3822 712/217 |
| 6,182,183 B1 | * | 1/2001 | Wingard | G06F 13/385 710/1 |
| 2007/0180315 A1 | * | 8/2007 | Aizawa | G06F 11/1637 714/15 |
| 2010/0169889 A1 | * | 7/2010 | Tsuji | G06F 9/3885 718/102 |
| 2016/0085721 A1 | * | 3/2016 | Abali | G06F 9/3001 712/15 |

* cited by examiner

*Primary Examiner* — John M Lindlof
(74) *Attorney, Agent, or Firm* — Norton Rose Fulbright US LLP; Gerard Messina

(57) ABSTRACT

A processing unit, in particular, a microcontroller for a control unit, which includes at least one processing core, one primary memory device, and at least one main connection unit for connecting the at least one processing core to the primary memory device, the processing unit including at least two functional units, the processing unit including at least one functional unit designed as a data flow control unit, which is designed to receive input data, to evaluate the input data, and to generate output data as a function of the evaluation.

25 Claims, 10 Drawing Sheets

PROCESSING UNIT AND OPERATING METHOD THEREFOR

CROSS REFERENCE

The present application claims the benefit under 35 U.S.C. § 119 of German Patent Application No. DE 102017217908.2 filed on Oct. 9, 2017, which is expressly incorporated herein by reference in its entirety.

BACKGROUND INFORMATION

The present invention relates to a processing unit that includes at least one processing core, a primary memory device and at least one main connection unit for connecting the at least one processing core to the primary memory device. The present invention further relates to an operating method for such a processing unit. Such processing units are commercially available, for example, in the form of microcontrollers.

An object of the present invention is to improve a processing unit of the aforementioned type to the extent that it exhibits an increased flexibility and an increased usage benefit.

SUMMARY

The object may be achieved in accordance with the present invention in the processing unit described herein.

The functional units according to the present invention advantageously offer the possibility of expanding a processing power and/or the functionality of the processing unit. A direct data flow, in particular, is enabled by the possibility according to the present invention of a direct data exchange between the functional units, which does not include the other components of the processing unit such as, for example, its processing cores or the primary memory device. In this way, it is possible to unburden the processing cores or the primary memory device or the main connection unit while, at the same time, one or multiple functional units according to the present invention perform calculation tasks or other tasks provided for it.

The data flow control unit according to the present invention, which may be implemented according to preferred specific embodiments in the form of a specifically designed functional unit, may advantageously control a data flow of data to be processed by the processing unit at the level of the functional units.

The processing unit according to the present invention may be particularly preferably used in a control unit for a target system, for example, in a control unit for an internal combustion engine of a motor vehicle or for a radar-based distance measuring system or the like. In contrast to conventional processing units such as, for example, conventional microcontrollers, the processing unit according to the present invention is advantageously expanded by the functionality provided by the functional units and described in greater detail below, and may therefore also be considered to be a microcontroller with the additional functionality enabled according to the present invention. In general, the processing unit according to the present invention may be used wherever conventional processing units are used, such as, for example, microcontrollers or microprocessors or digital signal processors or the like, and where an additional functionality and/or a higher performance, as it is provided by the functional units according to the present invention, is desirable. It is further possible to replace conventional processing units present in existing systems with the processing unit according to the present invention, in order to enable a more efficient processing of calculation tasks and other tasks previously carried out by the conventional processing units. The use of the processing unit according to the present invention is particularly advantageously possible according to some specific embodiments also in the processing of safety-relevant data or for processing cryptographic algorithms.

In one advantageous specific embodiment, it is provided that at least one primary connection unit is provided, which is designed to establish at least temporarily a, in particular, direct data connection between the first functional unit and at least one additional functional unit of the at least two functional units. This advantageously enables the control of a data exchange or data flow between various functional units, so that even during the operation of the processing unit, a configuration or re-configuration of the data connection (connections) between the relevant functional units is possible, thereby achieving an increased flexibility. In one preferred specific embodiment, the primary connection unit includes at least one crossbar switch. The crossbar switch is particularly preferably designed as a non-blocking crossbar switch. In this case, the crossbar switch enables data connection to be established at any time between all functional units connected to the crossbar switch and, if necessary, additional units connected to the crossbar switch such as, for example, components of the processing unit. In other specific embodiments, it is also possible to implement the primary connection unit as crossbar switch, but not to design the crossbar switch as non-blocking. In other specific embodiments, the primary connection unit may also include other structures, for example, at least one bus system, which establishes a data connection between the functional units connected to the bus system. In other specific embodiments, the primary connection unit may also include at least one direct data connection between at least two functional units. Furthermore, direct data connections between more than two functional units are possible in other specific embodiments.

In another specific embodiment, at least one secondary connection unit is provided, which is designed to establish a data connection between the main connection unit and at least one functional unit and/or a data connection between the main connection unit and at least one primary connection unit, as a result of which an efficient link for data transmission exists between the relevant functional units and the main connection unit. The main connection unit may be designed, for example, as a so-called "core interconnect", i.e., may represent a central connection unit for the high-performance connection (in particular with high data rates and/or low latencies) of the components of the processing unit according to the present invention among themselves. In one preferred specific embodiment, the main connection unit may preferably also be designed as a crossbar switch, in particular, as a non-blocking crossbar switch.

In another preferred specific embodiment, at least one secondary memory device is provided, a direct data connection existing between the at least one secondary memory device and at least one functional unit. In the present context, a direct data connection between the secondary memory device and the at least one functional unit is understood to mean a data connection, which enables a data exchange between the secondary memory device and the at least one functional unit, without using the main connection unit for such purpose. In other words, a data exchange in the present specific embodiment may take place directly between one functional unit or multiple functional units and the secondary memory device, as a result of which the main connection unit is not loaded, so that this main connection unit is usable elsewhere, for example, for exchanging data between the processing cores and the primary memory device and the like.

In other specific embodiments, it is provided that at least one component of the processing unit is designed to control at least one data flow between functional units among themselves and/or between functional units and additional components of the processing unit as a function of the output data.

In some specific embodiments, the aforementioned data flow may be controlled, for example, by the data flow control unit or by another functional unit in such a way that the aforementioned units interact as a whole and, thereby enabling, for example, the mapping of a superordinate algorithm or partial algorithm on more than one single functional unit, as a result of which the logical network of multiple functional units thus obtained is able to achieve a higher complexity than individual functional units not interacting in this manner.

The data flow control unit according to the present invention may, according to some specific embodiments, carry out or assume control tasks that are not already accomplished by an interconnection of regular "simple" functional units. The data flow control unit in other specific embodiments may, for example, also couple partial algorithms to form whole algorithms, the partial algorithms being made up of multiple functional units and of the data flow control unit controlling the partial algorithms, for example, as well as, if necessary, at least one additional data flow control unit, which is logically superior to the partial algorithms and as a result connects these to form a whole.

In other specific embodiments, it is provided that the data flow control unit is designed to subject the input data to a comparison with target data and to generate the output data as a function of the comparison. For this purpose, the data flow control unit may have at least one, in particular, "dedicated" comparator.

In other specific embodiments, it is provided that the data flow control unit includes an evaluation unit, which is designed to evaluate the input data and/or to generate output data as a function of the evaluation.

In other specific embodiments, it is provided that the data flow control unit is designed to control an operation of multiple functional units of the processing unit, for example, for implementing comparatively complex algorithms or calculation tasks, the data flow control unit controlling, for example, the operation of individual functional units within the context of the algorithms or calculation tasks.

In other specific embodiments, it is provided that the data flow control unit is designed to exchange data with at least one external component, in particular, algorithmic data and/or control data.

In other specific embodiments, it is provided that the data flow control unit is designed to wait for predefinable input data or control data, in particular, in order to synchronize its operation with at least one other component of the processing unit (for example, with a timer module, A/D converter, interrupt controller, external interface). The input data or control data may be fed to the data flow control unit in some specific embodiments, for example, via at least one other component of the processing unit (for example, processing core, another data flow control unit, another functional unit, etc.).

In other specific embodiments, it is provided that the data flow control unit is designed to output predefinable and/or calculated output data or control data, in particular, in order to control at least one other component of the processing unit (for example, timer module, interrupt controller, external interface). In some specific embodiments, the output data or control data may be fed to the at least one other component of the processing unit (for example, processing core, another data flow control unit, another functional unit, etc.), for example, by the data flow control unit.

In other specific embodiments, it is provided that the data flow control unit is designed to forward incoming data directly or modified to one or multiple other functional units.

In other specific embodiments, it is provided that the data flow control unit is designed to use loop counters, in particular, their receipt and evaluation as well as the generation and transmission to other functional units for controlling a data flow between functional units.

In other specific embodiments, it is provided that the data flow control unit is designed to manage and/or to control iterative and/or recursive calculations of data by at least one other functional unit, in particular, to manage counters for the iterative and/or recursive calculation.

In other specific embodiments, it is provided that the data flow control unit is configurable. For example, the data flow control unit may have a configuration memory that includes one or multiple configuration registers, in which a configuration controlling the operation of the data flow control unit is at least temporarily storable. In some specific embodiments, the data flow control unit may upload or download, in particular, independently, configuration data from a memory of the processing unit, in particular with the aid of a memory access to the primary memory device and/or to the secondary memory device, for example, via a corresponding memory interface. In other specific embodiments, the behavior of the data flow control unit may also be configurable with respect to the uploading and downloading of configuration data. The configuration data uploaded or downloaded from the memory may be utilized for configuring the data flow control unit or for configuring downstream functional units.

In another preferred specific embodiment, at least one of the functional units, in particular, the data flow control unit, is designed as a hardware circuit, in particular, completely as a hardware circuit. As a result, calculations, logic operations and other functions provided by the relevant functional unit may advantageously be carried out particularly rapidly and efficiently.

In another advantageous specific embodiment, it is provided that at least one of the functional units, if necessary, also the data flow control unit, includes at least one of the following elements: a microcontroller, a digital signal processor (DSP), a programmable logic circuit (for example, an FPGA, field programmable gate array), an application specific integrated circuit (ASIC).

In one specific embodiment, it is provided that all functional units, in particular, also the at least one data flow control unit, are designed as hardware circuits, in particular, completely as hardware circuits. In other specific embodiments, it is possible that one or multiple functional units are designed as hardware circuits, in particular, completely as hardware circuitry, and that at least one component not designed completely as a hardware circuit, or another component in the form of an additional functional unit is provided. In one particularly preferred specific embodiment, for example, a first number of functional units may be provided, which are designed completely as hardware circuits, and an additional functional unit may include, for example, a microcontroller or a programmable logic module or a programmable logic circuit.

In one additional advantageous specific embodiment, it is provided that at least one of the functional units includes at least one of the following components: an adder, a multiplier, a divider, a shift register, a barrel shifter, a comparator, a multiplication accumulator (MAC), an arithmetic logic unit (ALU), a memory unit, a register, a multiplexer, a demultiplexer, an interface, a unit for evaluating exponential functions, a unit for evaluating trigonometric functions.

In another preferred specific embodiment, at least one of the functional units includes at least one coarse-grained hardware element. Alternatively or in addition, at least one of the functional units may be designed as a coarse-grained hardware element. The term "coarse-grained" in the present case means that the relevant hardware element includes more than one logic gate or is formed from more than one logic gate. The gates according to one specific embodiment are unchangeable in terms of function and/or in terms of connection to one another. Granularity is understood in general to mean the degree to which a system is made up of individual units distinguishable from one another. A coarse-grained system is made up of comparatively few, comparatively large coarse-grained elements, whereas a fine-grained system is made up of comparatively numerous, comparatively small fine-grained elements. Specifically, granularity in the area of processor architecture may be described by the number of logic gates and along with this, in particular, by a relation between arithmetic operations or processing times and communication or data exchange. In fine-grained hardware elements (in each case a logic gate), simple logical operations may be carried out rapidly in a comparatively short processing time, however, data are frequently exchanged between individual elements. In coarse-grained hardware elements on the other hand (in each case multiple logic gates), in particular, complex operations, respectively, are carried out with comparatively long processing times and data are rarely exchanged between individual elements.

Thus, coarse-grained hardware elements are understood to mean, in particular, elements, each of which are able to automatically carry out complex arithmetic operations, in particular, without frequently exchanging data between each other for such purpose. For example, the individual, coarse-grained hardware elements are each designed as one of the following elements: higher complex elements such as an arithmetic-logic unit (ALU), a memory access unit, a communication interface and/or less complex units such as a comparator, an adder, a multiplier, a divider, a shift register, a barrel shifter, a multiplication adder ("Multiply-Accumulate" (MAC)), a register or a register block, a memory unit (for example, RAM, Flash etc.), a multiplexer (for example, 2:1-MUX, M:N-MUX), a demultiplexer.

In particularly preferred specific embodiments, a comparatively complex calculation unit is provided by multiple components connected to one another, such as, for example, an adder, a multiplier, a divider, a shift register, a barrel shifter, a comparator, a multiplication accumulator, an arithmetic logic unit, a memory unit, a register, a multiplexer, an interface or generally coarse-grained hardware elements, which may form the functional unit(s) or components thereof, according to the present invention at least one first functional unit being advantageously designed, to receive first data from at least one additional functional unit and/or to send second data to at least one additional functional unit, as was previously described above. As a result, a data flow may be defined, which also enables, among other things, the performance of comparatively complex calculations, which utilize, for example a plurality of the aforementioned components or coarse-grained hardware elements, for example, in a predefinable order according to an algorithm to be evaluated or according to another calculation rule.

According to another aspect of the present invention, this data flow may also be dynamically influenced or changed, i.e., reconfigured, that is, during a runtime of the processing unit according to the present invention, in particular, by the data flow control unit according to the present invention. In other preferred specific embodiments, this may be accomplished, for example, by a corresponding control of the primary connection unit.

According to another advantageous specific embodiment, it is provided that the processing unit is designed to change a configuration of at least one functional unit, in particular, also of the data flow control unit (for example, of one or multiple coarse-grained elements contained therein), and/or to check a state or the configuration of at least one functional unit. This further increases the flexibility and the usage benefit of the processing unit according to the present invention. In one specific embodiment, for example, it may be provided that at least one functional unit includes configuration registers, which may be situated, for example, locally in the functional unit. Via writing accesses of the processing unit, the processing unit is therefore able, for example, by virtue of one of its processing cores, to change the configuration of the relevant functional unit. In other words, a processing core of the processing unit in some specific embodiments may, for example, be designed to change a configuration of at least one functional unit (in particular, also of the data flow control unit) and/or to check a state or the configuration of at least one functional unit.

In other specific embodiments, it is possible that at least one functional unit or the at least one data flow control unit is designed to change a configuration of at least one (other) functional unit or of one (other) data flow control unit and/or to check a state or the configuration of at least one functional unit. It is further possible that in other specific embodiments, a functional unit is designed to change and/or to check its own configuration.

In preferred specific embodiments, it may be provided that the at least one functional unit or the at least one data flow control unit is designed to carry out a configuration or reconfiguration of itself or of another component (for example, another functional unit or data flow control unit) as a function of the evaluation of input data. For example, it may be determined in this case as a function of the evaluation of input data whether the at least one functional unit or the at least one data flow control unit even undertakes a configuration or reconfiguration of itself or of the other component and/or in which way such a configuration or reconfiguration takes place.

In other preferred specific embodiments, it may be provided that the at least one functional unit or the at least one data flow control unit is designed to access the primary and/or the secondary memory device, in particular, in order to read and/or to write configuration data. In other specific embodiments, it may be provided that the at least one functional unit or the at least one data flow control unit is designed to utilize such read data, in particular, configuration data, for a dedicated configuration and/or to forward them to at least one additional functional unit.

In other specific embodiments, it is possible that at least one peripheral unit of the processing unit is designed to change a configuration of at least one functional unit and/or to check a state or the configuration of at least one functional unit. The peripheral unit may, for example, be a DMA control device. This advantageously enables the DMA control device to essentially autonomously read out, for example, configuration information for a particular functional unit from a first memory area of the processing unit and to write the read out configuration information into a corresponding configuration register of the relevant functional unit.

In an another specific embodiment, it is provided that at least one of the functional units is designed to change a configuration of the primary connection unit and/or of at least one secondary connection unit and/or to check a state or the configuration of at least the primary connection unit and/or of at least one secondary connection unit. The relevant functional unit may, for example, determine as a function of an evaluation of its input data whether a) a configuration or reconfiguration of the primary connection unit and/or of at least one secondary connection unit is even supposed to be carried out, and/or b) in what way such a configuration or reconfiguration takes place.

According to another specific embodiment, the configuration of the coarse-grained hardware elements is understood to mean a substantiation of the function of the coarse-grained hardware elements from the available possibilities as well as, in particular, also from the connection structure of the individual elements (for example, of the primary connection unit). Thus, by changing the configuration, the processing unit or a functional unit is able to (re)configure the function of the elements on the hardware level, as well as (re-)connect the elements to one another in various ways and thereby enables the adaption of the processing unit to various algorithms on the hardware level. In a particularly preferred specific embodiment, the configuration or connection of various functional units to one another may take place by specifying corresponding target addresses for data, for example, in the form of data packets, exchanged between the functional units.

In another advantageous specific embodiment, it is provided that for the configuration or reconfiguration of one or multiple functional units or the data flow control unit, corresponding pieces of configuration information are read from a source, for example, from a configuration memory, and these pieces of configuration information are written into the corresponding configuration registers of the relevant functional unit. The configuration memory may, for example, be situated in the secondary memory device. Alternatively or in addition, the configuration memory may also be situated in the primary memory device. In other specific embodiments, it is further possible to provide the pieces of configuration information with the aid of components external to the processing unit, for example, in the form of (serial) flash memories, which are connected, for example, to corresponding interfaces of the processing unit.

In general, the primary memory device of the processing unit may advantageously include in one specific embodiment both a working memory (direct access memory, RAM, random access memory) as well as at least one flash memory, i.e. a non-volatile memory. In other specific embodiments, the secondary memory device is preferably designed as a RAM memory, in particular as a static RAM memory (SRAM).

In another advantageous specific embodiment, it is provided that at least one of the functional units includes an input interface for receiving the first data and/or an output interface for outputting the second data. This or these input or output interface or interfaces may be used in preferred specific embodiments, in particular for exchanging data (sending and/or receiving) with other similar or different functional units (or, if necessary, also with other components, which include corresponding interfaces that are compatible with the input or output interface or interfaces of the functional units).

According to another specific embodiment, the input interface and/or the output interface may, for example, be designed to receive first data intended for the functional unit in a predefinable format, for example, in the form of data packets, or to output particular second data in a predefinable format, for example, again, in the form of data packets, for outputting to a another unit, for example, another functional unit.

The input interface may, for example, be designed to be connected to the primary connection unit. Thus, depending on the implementation of the primary connection unit, the input interface may, for example, be designed to be connected to a crossbar switch and/or to a bus system. Alternatively or in addition, the input interface may also be designed to establish a direct data connection between the relevant functional unit and at least one additional functional unit, for example, with the aid of directly interconnected data lines. The same implementations apply accordingly for the design of the output interface in other specific embodiments of the present invention.

In another specific embodiment, it is provided that at least one of the functional units includes a local control device for controlling an operation of the functional unit. Such a local control device may, for example, include at least one state machine.

In another advantageous specific embodiment, at least one of the functional units includes a local calculation unit. In another advantageous specific embodiment, the local calculation unit may include at least one coarse-grained hardware element or may be designed as a coarse-grained hardware element. In another advantageous specific embodiment, the local calculation unit may include at least one of the components: an adder, a multiplier, a divider, a shift register, a barrel shifter, a comparator, a multiplication accumulator (MAC), an arithmetic-logic unit (ALU), a memory unit, a register, a multiplexer, a demultiplexer, an interface, a unit for evaluating exponential functions, a unit for evaluating trigonometric functions.

In another advantageous specific embodiment, it is provided that at least one of the functional units includes a local configuration memory. The local configuration memory may particularly preferably include a register memory, the local configuration memory including, in particular, a plurality of configuration registers. As a result, an efficient configuration and reconfiguration is possible, even during the operation of the functional unit, by modifying one or multiple configuration registers in the desired manner. The configuration registers may be modified, for example, by the functional unit itself and/or by another functional unit and/or by another component of the processing unit such as, for example, a processing core.

In another advantageous specific embodiment, it is provided that at least one of the functional units includes a local functional memory. The local functional memory may particularly preferably include a register memory or represent a portion of a register memory. The local functional memory may include, in particular, at least one functional register. The local functional memory may advantageously be used for storing, at least temporarily input data and/or output data of the functional unit or intermediate results of calculations of the functional unit.

In another advantageous specific embodiment, it is also possible to equip the functional unit with a multitude of register memories, a first number of the register memories being usable as configuration registers and a second number of the register memories being usable as functional registers. In other specific embodiments, it is further possible that the first number or the second number varies and is changeable, for example, via configuration. In this way, an operation of the functional unit may be very flexibly structured and, in particular, the local (register) memory may be dynamically adapted to calculations to be carried out by the functional unit.

Additional advantageous embodiments are described herein.

Additional approaches to achieving the object of the present invention are described herein in the context of an example control unit and an example method.

Additional features, potential applications and advantages of the present invention result from the following description of exemplary embodiments of the present invention, which are depicted in the figures. All described or depicted features, alone or in arbitrary combination, form the subject matter of the present invention, regardless of their wording or depiction in the description or the figures.

DETAILED DESCRIPTION OF EXAMPLE EMBODIMENTS

Figure 1A:
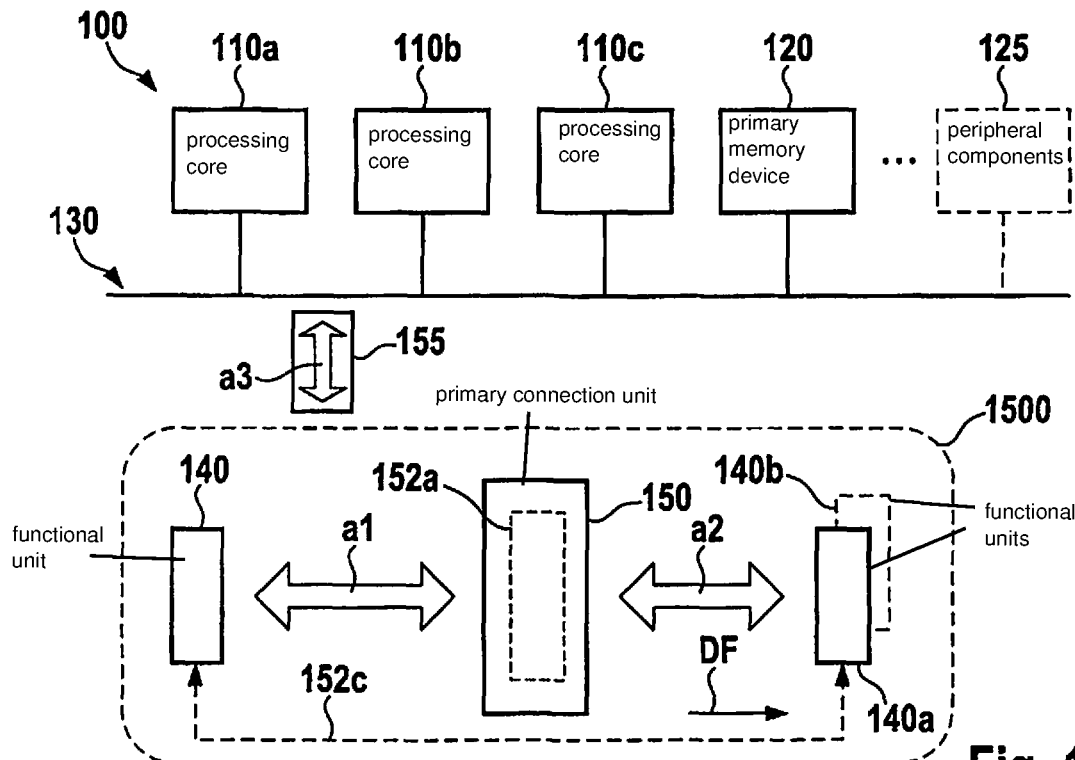
FIG. 1A schematically shows a block diagram of one specific embodiment of the processing unit according to the present invention.

FIG. 1A schematically shows a block diagram of one specific embodiment of processing unit 100 according to the present invention. Processing unit 100 includes multiple processing cores 110a, 110b, 110c, as well as a primary memory device 120. A main connection unit 130, which may, for example, be a bus system or a crossbar switch, is provided for connecting the processing cores to one another or for connecting the processing cores to primary memory device 120. Processing unit 100 optionally includes additional peripheral components, which is indicated in the present case by block 125 depicted with dashed lines. Such peripheral components may, for example, be analog/digital converters, input/output interfaces, timer modules or the like.

Primary memory device 120 in one specific embodiment may advantageously include both at least one working memory (direct access memory, RAM, Random Access Memory), in particular, a SRAM-type and/or DRAM-type, as well as also at least one non-volatile memory (non-volatile RAM (NVRAM)), for example as a flash, an EPROM, a ferroelectric RAM (FeRAM), a magnetoresistive RAM (MRAM), a phase-change RAM (PCRAM).

According to the present invention, processing unit 100 includes at least two functional units, at least one first functional unit 140a being designed, to receive first data from at least one additional functional unit 140, 140b and/or to send or output second data to at least one additional functional unit 140, 104b.

Functional units 140, 140a, 140b according to the present invention advantageously offer the possibility of expanding a processing power and/or the functionality of processing unit 100. In particular, a data flow is enabled by the possibility according to the present invention of a direct data exchange between the functional units, which does not include the other components of processing unit 100 such as, for example, its processing cores 110a, 110b, 110c or primary memory device 120 or main connection unit 130. In this way, it is possible to unburden processing cores 110a, 110b, 110c, primary memory device 120 and main connection unit 130, while at the same time, one or multiple functional units 140, 140a, 140b according to the present invention perform calculation tasks or other tasks provided for them.

Figure 5:
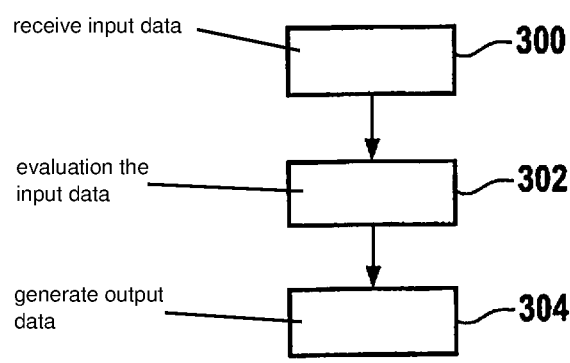
FIG. 5 schematically shows a simplified flow chart of one specific embodiment of the method according to the present invention.

Further according to the present invention, the processing unit includes at least one functional unit designed as a data flow control unit 140b, which is designed to receive input data, cf. step 300 of FIG. 5, to evaluate 302 the input data, and to generate output data as a function of evaluation 302, cf. step 304 of FIG. 5. As a result, data flow control unit 140b may advantageously influence a data flow DF (FIG. 1A) within processing unit 100, in particular, between functional units 140, 140a.

Evaluation 302, for which data flow control unit 104b in some specific embodiments may be assigned a separate evaluation unit (cf. reference numeral 1490 further below) in order to carry it out, may include in some specific embodiments at least one of the following measures: receiving input data and/or comparing data, in particular, input data, with predefinable reference values or other data values, for example, constants, start values, values and intermediate results of an algorithm, status values (timer values, loop counters, loop planes, ready, waiting, valid, acknowledge, error, triggers (for example, start, enable, interrupt, . . . ).

In other specific embodiments, it is provided that data flow control unit 140b is designed to subject the input data to a comparison with target data and to generate the output data as a function of the comparison. For this purpose, data flow control unit 140b may have at least one, in particular, "dedicated" comparator.

For the following description, it is assumed that, for example, functional unit 140b, in particular, is designed as a data flow control unit within the meaning of the present specific embodiments. In other specific embodiments, however, it may also be provided that at least one additional unit of the present described or designated functional units 140, 140a, 140b, . . . , 140 *m*; 1400; 1400a; 1400b; 1400c; 1400e; 1400f; 1400g, 1400h, 1400h', 1400", 1400i, 1400i', 1400k is designed as a data flow control unit within the meaning of the present invention, thus, if necessary, in addition to the otherwise described function or configuration, is designed for carrying out the method according to FIG. 5 or according to specific embodiments based on the method.

For example, functional units 140, 140a, 140b according to the present invention, i.e., in particular, also data flow control unit 140b, which are implemented preferably largely, particularly preferably however completely, as a hardware circuit, may be designed to carry out calculations and/or logic operations and/or other functions. The implementation of look-up tables, characteristic curves and/or characteristic diagrams by functional units is also possible. Details on an internal structure of the functional units are indicated further below, among others, with reference to FIGS. 2A, 2B, 2C, 3A, 3B. Initially, however, the arrangement of the functional units within processing unit 100 according to the present invention and its data link to central components 110a, 110b, 110c, 120, 130 of processing unit 100 will be discussed in the following with reference to FIGS. 1A through 1G.

In one advantageous specific embodiment, it is provided that at least one primary connection unit 150 is provided, which is designed to establish at least temporarily a, in particular, direct data connection between first functional unit 140a and at least one additional functional unit 140, 104b. This advantageously enables the control of a data exchange or data flow between various functional units, so that a configuration or reconfiguration of the data connection (s) between the relevant functional units is possible, even during the operation of the processing unit, thereby achieving an increased flexibility. A direct data connection in the present case is understood to mean that data may be exchanged between the functional units involved without using main connection unit 130 of processing unit 100. Instead, primary connection unit 150 enables such a direct data connection between the functional units connected to it, cf. arrows a1, a2, which indicate a data flow between components 140, 140a, 140b as well as primary connection unit 150.

In one preferred specific embodiment, primary connection unit 150 includes at least one crossbar switch 152a. The crossbar switch is particularly preferably designed as a non-blocking crossbar switch. In this case, crossbar switch 152a enables data connections to be established at any time between all functional units 140, 140a, 140b connected to crossbar switch 152a and, if necessary, to additional units connected to the crossbar switch such as, for example, component 130 of the processing unit.

In other specific embodiments, it is also possible to design primary connection unit 150 as a non-blocking crossbar switch.

Figure 1B:
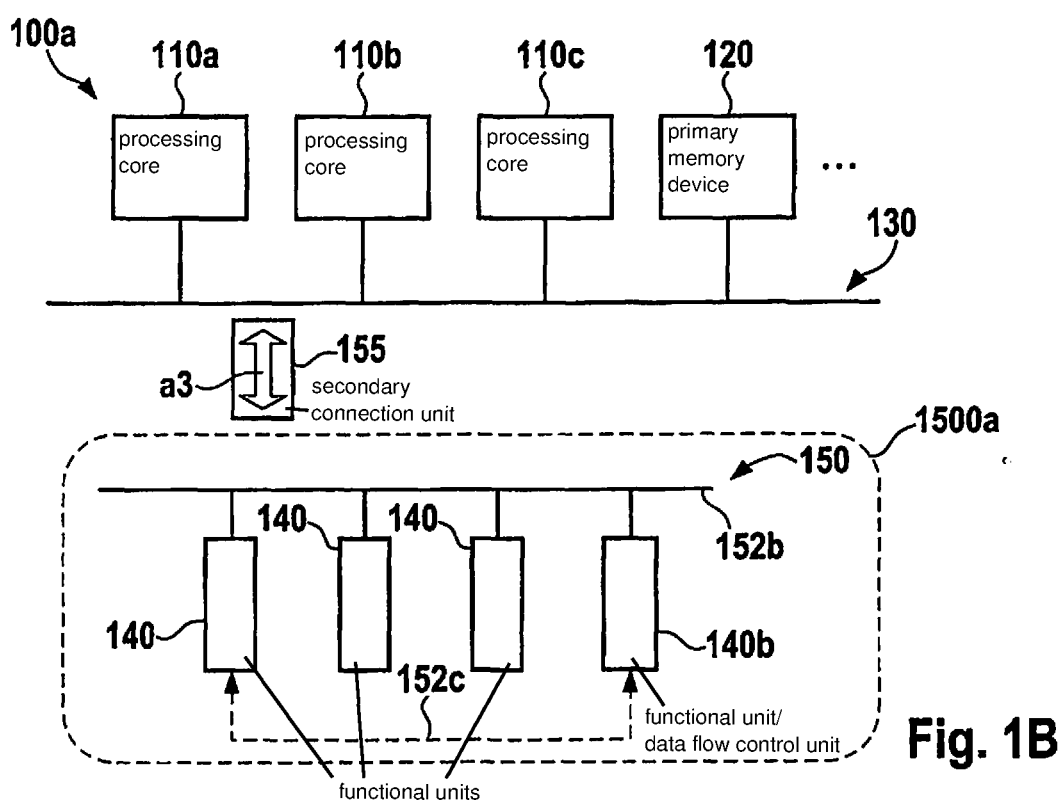
FIGS. 1B through 1G schematically show other specific embodiments of the processing unit according to the present invention.

In another specific embodiment, primary connection unit 150 may also include other structures, for example, at least one bus system, cf. FIG. 1B, which establishes a data connection between functional units 140 connected to bus system 152b. In other specific embodiments, primary connection unit 150 may also include at least one direct data connection between at least two functional units 140, 140a, cf. arrow 152c in FIG. 1A. Direct connections between other or more than two functional units are furthermore also possible in other specific embodiments. In another specific embodiment, it may be provided that the at least one primary connection unit 150 includes multiple of the aforementioned connection mechanisms, i.e., for example, a crossbar switch for connecting several functional units or all functional units to one another, as well as, for example, a bus system which connects multiple or all functional units.

In another specific embodiment, at least one secondary connection unit 155, cf. FIG. 1A, is provided, which is designed to establish a data connection, cf. arrow a3, between main connection unit 130 and at least one functional unit 140, either directly and/or indirectly via primary connection unit 150, as a result of which an efficient link for transmitting data between relevant functional units 140, 140a, 140b as well as 110a, 110b, 110c, 120, 125 via main connection unit 130 exists.

Main connection unit 130 according to one specific embodiment may be designed, for example, as a so-called "core interconnector", i.e., as a central connection unit for a high-performance connection (in particular, with high data rates and/or low latencies) of components 110a, 110b, 110c, 120, 125, 140 of processing unit 100 among each other according to the present invention. In one particularly preferred specific embodiment, main connection unit 130 may also be designed as a crossbar switch in particular, as a non-blocking crossbar switch, as previously described above.

On the whole, providing functional units 140, 140a, 140b and their flexible connection among each other, which is established with the aid of primary connection unit 150, enables the provision of additional processing power and of additional functionalities within processing unit 100 according to the present invention. The entirety of components 140, 140a, 140b, 150 may therefore be understood as a "flexible hardware extension" 1500 of processing unit 100, this flexible hardware extension 1500 being able to carry out arithmetic tasks particularly advantageously essentially autonomously, i.e., independently of components 110a, 110b, 110c, 120, 125, 130, but, if needed, being able to exchange data efficiently with at least one of components 110a, 110b, 110c, 120, 125, 130 via the link with secondary connection unit 155.

In some specific embodiments, the data flow DF described above may, for example, be controlled by data flow control unit 140b and/or by another functional unit in such a way that the aforementioned units 140, 140a, 140b interact as a whole and thereby enable, for example, the mapping of a superordinate algorithm or partial algorithm on more than one individual functional unit, as a result of which the logical network of multiple functional units thus obtained is able to achieve a higher complexity than individual functional units not interacting in this manner.

Data flow control unit 140b according to the present invention may according to some specific embodiments, in particular, carry out or assume control tasks that are not already accomplished by an interconnection of regular "simple" functional units 140, 140a. In other specific embodiments, data flow control unit 140b may, for example, also couple partial algorithms to whole algorithms, the partial algorithms, for example, being made up of multiple functional units 140, 140a and of data flow control unit 140b controlling the partial algorithms, for example, and if necessary, of at least one additional data flow control unit (not shown), which is logically superordinate to the partial algorithms and as a result connects these to form a whole.

In particularly advantageous specific embodiments, it is provided that data flow control unit 140b is designed to subject the input data fed to it to a comparison with target data and to generate the output data as a function of the comparison. For this purpose, data flow control unit 140b may have at least one, in particular, "dedicated" comparator (cf. reference numerals 1490 from FIG. 2A).

In other specific embodiments, it is provided that data flow control unit 140b includes an evaluation unit, which is designed to evaluate the input data and/or to generate the output data as a function of the evaluation.

In other specific embodiments, it is provided that data flow control unit 140*b* is designed to control an operation of multiple functional units of processing unit 100, for example, for implementing comparatively complex algorithms or calculation tasks, the data flow control unit controlling, for example, the operation of individual functional units within the context of the algorithms or calculation tasks.

Figure 2A:
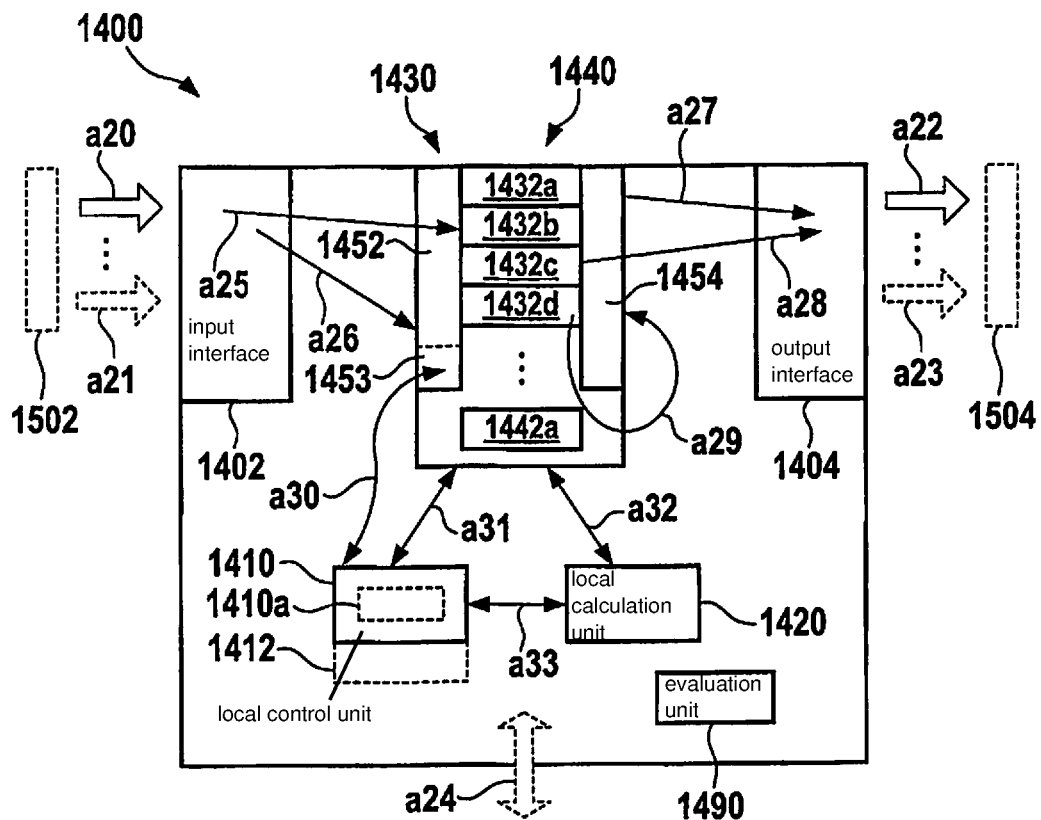
FIG. 2A schematically shows a simplified block diagram of a functional unit according to one specific embodiment of the present invention.
Figure 2B:
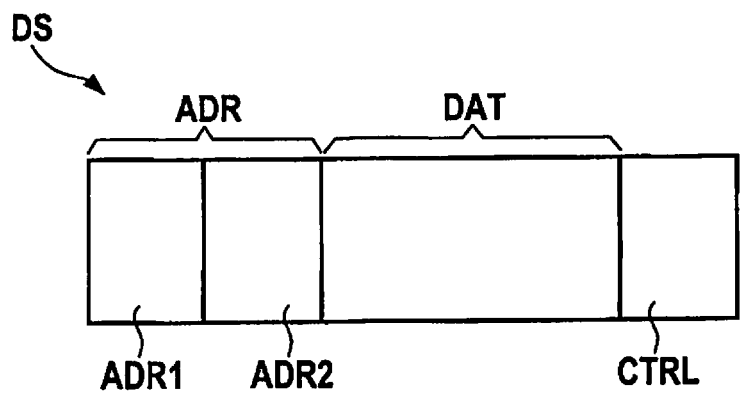
FIG. 2B schematically shows a data structure according to one specific embodiment of the present invention.
Figure 2C:
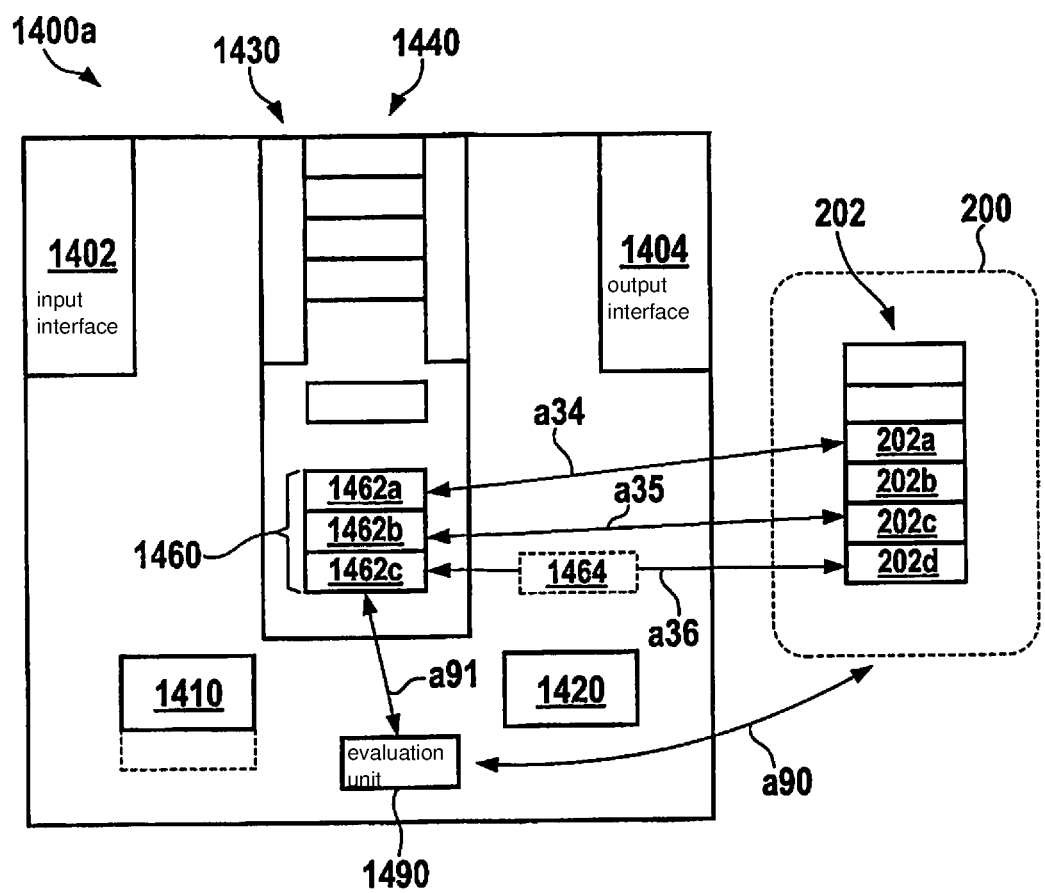
FIG. 2C schematically shows a simplified block diagram of a functional unit according to another specific embodiment of the present invention.

In other specific embodiments, it is provided that data flow control unit 140*b* is designed to exchange data with at least one external component 200 (for example, a timer module, an A/D converter, an interrupt controller, an external interface, cf. direct data connection a90 or indirect data connection a91 via a34, a35, a36, in each case, from FIG. 2C), in particular, algorithmic data and/or control data.

In other specific embodiments, it is provided that data flow control unit 140*b* is designed to wait for predefinable input data or control data (a90, a91), in particular, in order to synchronize their operation with at least one other component 140 or, for example, 110*a* or, for example, 200 of processing unit 100 (for example, with a timer module, an A/D converter, an interrupt controller, an external interface). In some specific embodiments, the input data or control data may be fed to data flow control unit 140*b*, for example, via at least one other component of the processing unit (for example, processing core 110*a*, another data flow control unit, another functional unit 140, etc.).

In other specific embodiments, it is provided that data flow control unit 140*b* is designed to output predefinable and/or calculated output data or control data (a90, a91), in particular, in order to control at least one other component 140 or, for example, 110*a* of the processing unit 100 (for example, a timer module, an interrupt controller, an external interface). In some specific embodiments, the output data or control data may be fed to the at least one other component of the processing unit (for example, processing core 110*a*, another data flow control unit, another functional unit 140, etc.), for example, by data flow control unit 140*b*.

In other specific embodiments, it is provided that data flow control unit 140*b* is designed to forward incoming data directly and/or modified to one or multiple other functional units 140.

In other specific embodiments, it is provided that data flow control unit 140*b* is designed to use loop counters, in particular, their receipt and evaluation and/or the generation and transmission to other functional units 140 for controlling a data flow between functional units.

In other specific embodiments, it is provided that data flow control unit 140*b* is designed to manage and/or control iterative and/or recursive calculations of data by at least one other functional unit, in particular, to manage counters for the iterative and/or recursive calculation.

In other specific embodiments, it is provided that data flow control unit 140*b* is configurable. For example, the data flow control unit may have a configuration memory that includes one or multiple configuration registers, in which a configuration controlling the operation of the data flow control unit is at least temporarily storable. In some specific embodiments, the data flow control unit may upload or download, in particular, independently, configuration data from a memory of the processing unit, in particular with the aid of a memory access to primary memory device 120 (FIGS. 1A through 1G) and/or to secondary memory device 160 (FIG. 1G), for example, via a corresponding memory interface. In other specific embodiments, the behavior of the data flow control unit may also be configurable with respect to the uploading and downloading of configuration data. The configuration data uploaded or downloaded from the memory may be utilized for configuring the data flow control unit or for configuring downstream functional units.

FIG. 1B shows another specific embodiment 100*a* of the processing unit according to the present invention. In the present specific embodiment, components 110*a*, 110*b*, 110*c*, 120, 125, 130, 152*c*, 155 are present essentially unchanged, but the flexible hardware extension in the present case includes a different structure and is therefore identified with reference numeral 1500*a* in FIG. 1B. In the present case, primary connection unit 150 is implemented in the form of a bus system 152*b*, to which multiple similar or different functional units 140 are connected. Functional units 140 and data flow control unit 140*b* may exchange data with one another via bus system 152*b*. Several of functional units 140 may also exchange data directly via direct connection 152*c*. A data connection between main connection unit 130 and bus system 152*b* is implemented by secondary connection unit 155, similar to FIG. 1A, cf. arrow a3.

Figure 1C:
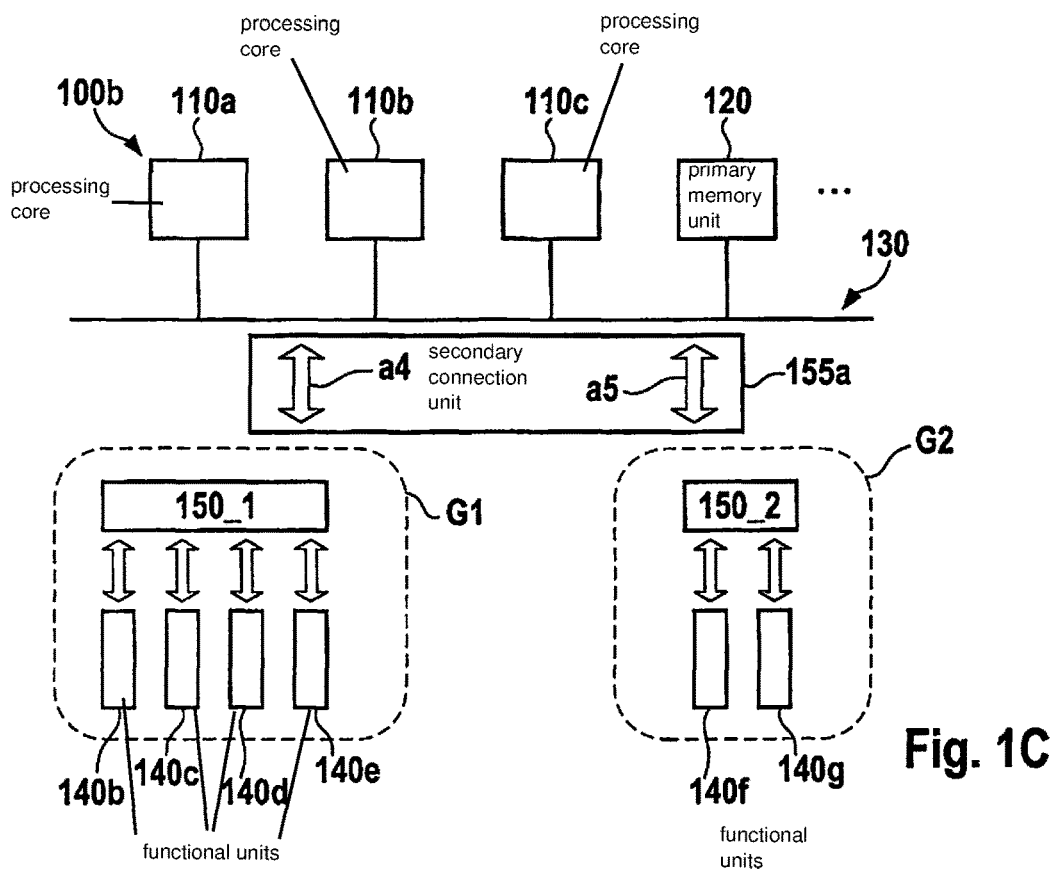

FIG. 1C shows another specific embodiment 100*b* of the processing unit according to the present invention, in which a flexible hardware extension is provided in the form of multiple groups G1, G2 of functional units. A first group G1 in the present case includes, for example, three functional units 140*c*, 140*d*, 140*e*, which are interconnected via a first primary connection unit 150_1. A second group G2 includes in the present case, for example, two functional units 140*f*, 140*g*, which are connected to one another via a second primary connection unit 150_2. First primary connection unit 150_1 is designed to establish, at least temporarily, a, in particular, direct data connection between functional units 140*c*, 140*d*, 140*e* of first group G1. Second primary connection unit 150_2 is designed to establish, at least temporarily, a, in particular, direct data connection between functional units 140*f*, 140*g* of second group G2. First primary connection unit 150_1 and/or second primary connection unit 150_2 may be designed, for example, as a crossbar switch, in particular, as a non-blocking crossbar switch, a bus system, a direct data connection or otherwise. In the present case, a data connection between groups G1, G2 and main connection unit 130 is implemented by a secondary connection unit 155*a*, which may be designed, for example, as a crossbar switch, a bus system or in another form. A corresponding data connection between groups G1, G2 and main connection unit 130 is symbolized by block arrows a4, a5. Secondary connection unit 155*a* may also be designed to establish a direct data connection between groups G1, G2 or their functional units, i.e., without the inclusion of main connection unit 130 for such a data connection.

Figure 1D:
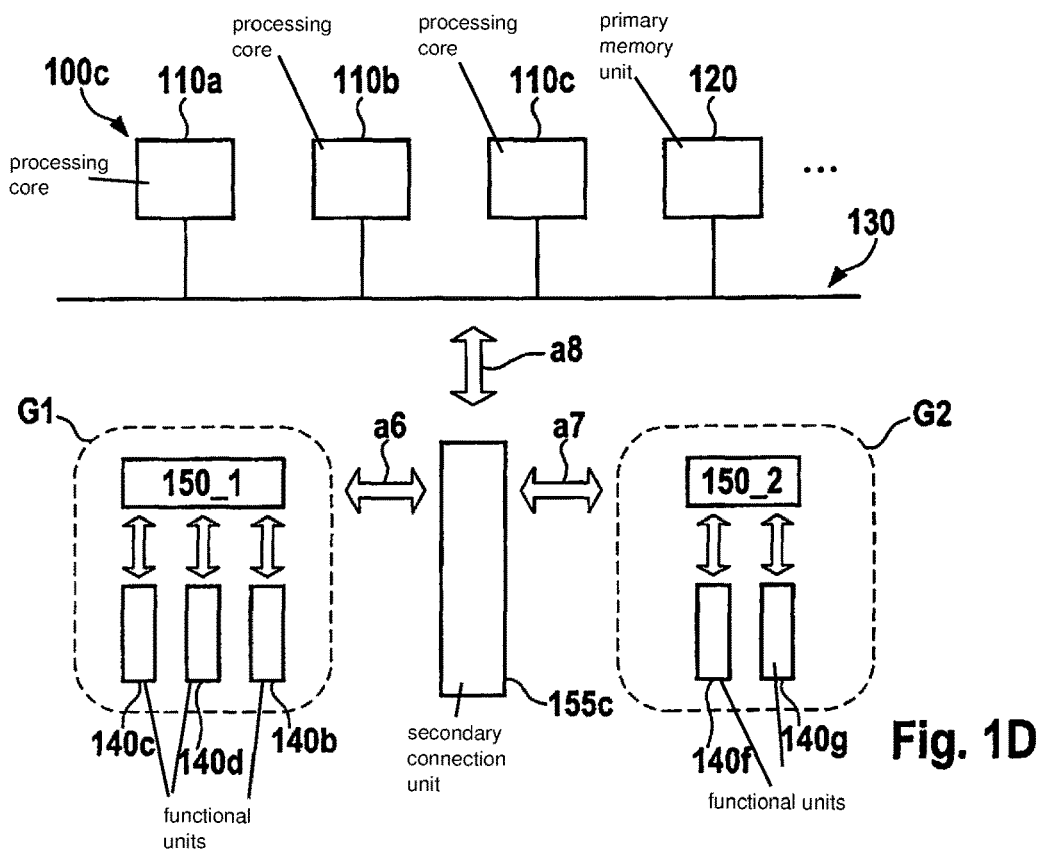

FIG. 1D shows another specific embodiment 100*c* of the processing unit according to the present invention. In contrast to the specific embodiment according to FIG. 1C, a secondary connection unit 155*c* is provided, which establishes a data connection a6, a7 between primary connection units 150_1, 150_2 of groups G1, G2, respectively, as well as a data connection a8 between these elements and main connection unit 130.

Figure 1E:
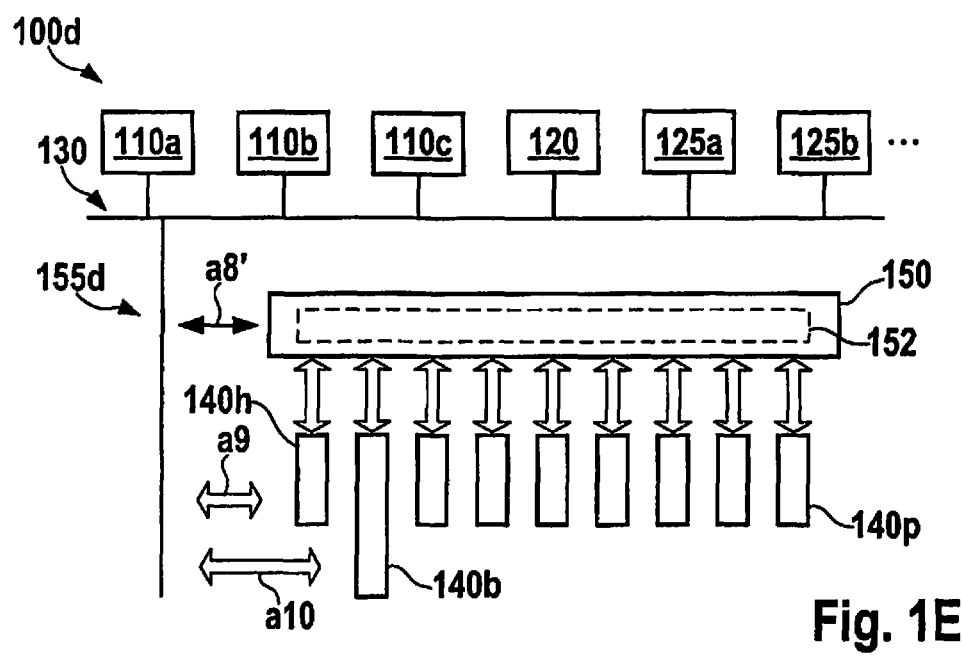

FIG. 1E shows another specific embodiment 100*d* of the processing unit according to the present invention. In this figure, additional peripheral components of processing unit 100*d* are shown such as, for example, analog/digital converter 125*a*, interface modules 125*b*. In this specific embodiment, a bus system 155*d* is also provided as a secondary connection unit, which establishes a data connection a8' between main connection unit 130 and primary connection unit 150. Primary connection unit 150, in turn, preferably includes a crossbar switch 152, in order to interconnect various functional units 140*i*, 140*h*, . . . , 140*p* as well as data flow control unit 140*b*. Functional unit 140*h*, in addition to its data connection to crossbar switch 152, optionally includes a direct data connection a9 to bus system 155*d*. Additional data flow control unit 140*b* is linked in comparable fashion to bus system 155*d* both via crossbar switch 152 and via a direction connection a10.

Primary memory device 120 of processing unit 100, 100*a*, 100*b*, 100*c*, 100*d* in some specific embodiments may include at least one direct access memory (RAM, random access memory). Primary memory device 120 may optionally also include additional memory systems, in particular, also non-volatile memory systems such as, for example, one or multiple flash memories.

In some specific embodiments, it is possible that one or multiple functional units 140 and/or data flow control units 140*b* access primary memory device 120, which normally takes place using main connection unit 130, secondary connection unit 155 and, if necessary, a primary connection unit 150 (FIG. 1A).

Figure 1F:
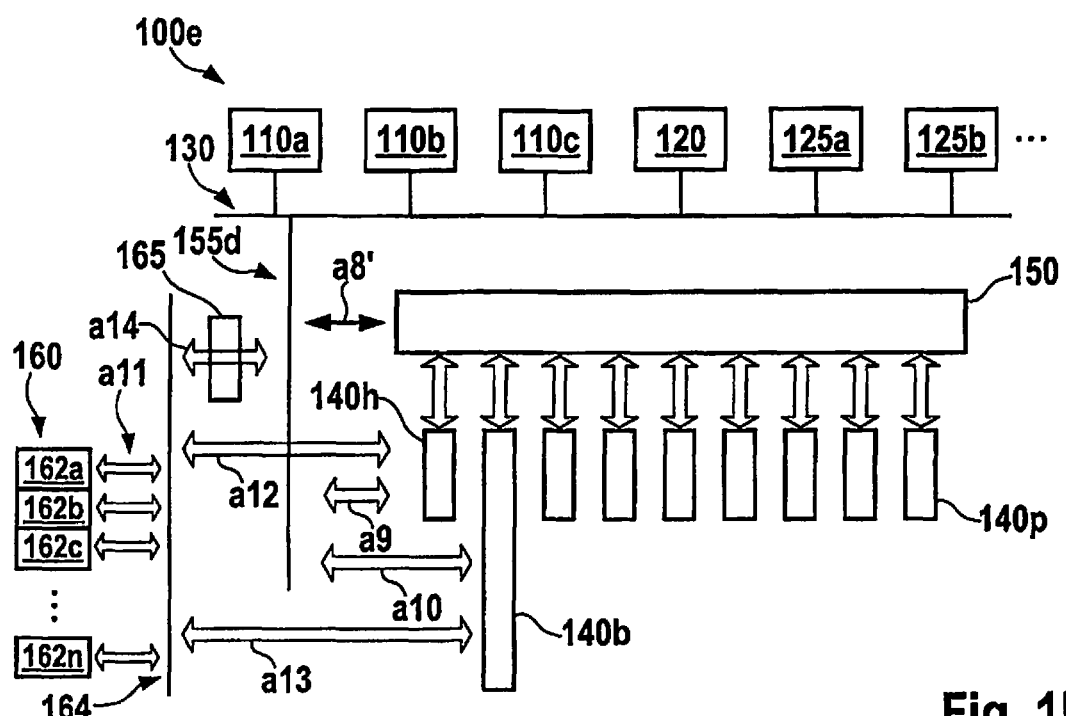

In another preferred specific embodiment 100*e* of the processing unit according to the present invention, which is described below with reference to FIG. 1F, at least one secondary memory device 160 is provided. Second memory device 160 is preferably designed as a direct access memory (RAM), in particular, as a static direct access memory (SRAM, static RAM). In the present case a secondary memory device 160 is depicted, for example; in other specific embodiments, however, multiple secondary memory devices 160 may also be provided. For such specific embodiments, the aspects described below, which are explained, for example, based on secondary memory device 160 depicted in FIG. 1F, apply accordingly.

In one particularly advantageous specific embodiment, secondary memory device 160 includes multiple memory banks 162*a*, 162*b*, 162*c*, . . . , 162*n*. The secondary memory device may, in particular, be designed to enable a parallel data access to at least two of the multiple memory banks 162*a*, 162*b*, 162*c*, . . . , 162*n*. This advantageously enables a high bandwidth for accesses to second memory device 160 or to its banks and, in particular, non-interrelated data blocks may also be written in parallel or simultaneously into secondary memory device 160 or read from secondary memory device 160.

In the present case, secondary memory device 160 is assigned a memory bus system 164, which enables an access to the memory banks of secondary memory device 160, cf. block arrows a11. Memory bus system 164 is advantageously coupled via a bus coupling unit 165 to bus system 155*d*, which enables the previously described data connection between crossbar switch 152 or functional units 140*i*, 140*h*, . . . , 140*p*, data flow control unit 140*b* and main connection unit 130. Bus coupling unit 165 enables a data exchange between bus system 155*d* and memory bus system 164, cf. arrow a14. This enables, in particular, memory areas of secondary memory device 160 to become visible in a global address space of processing unit 100*e* and thus to also be accessible, for example (read and/or write) for other peripheral components 125*a*, 125*b* of processing unit 100 according to the present invention.

In one particularly preferred specific embodiment, a direct data connection a12, a13 may also exist between individual functional units 140*h*, data flow control unit 140*b* and memory bus system 164, so that relevant functional units 140*h* and data flow control unit 140*b* are able to directly access secondary memory device 160, in particular, without having to use the crossbar switch of primary connection unit 150 or, if necessary, main connection unit 130.

In another specific embodiment (not shown), multiple parallel memory devices 160 having the aforementioned features may be present.

Figure 1G:
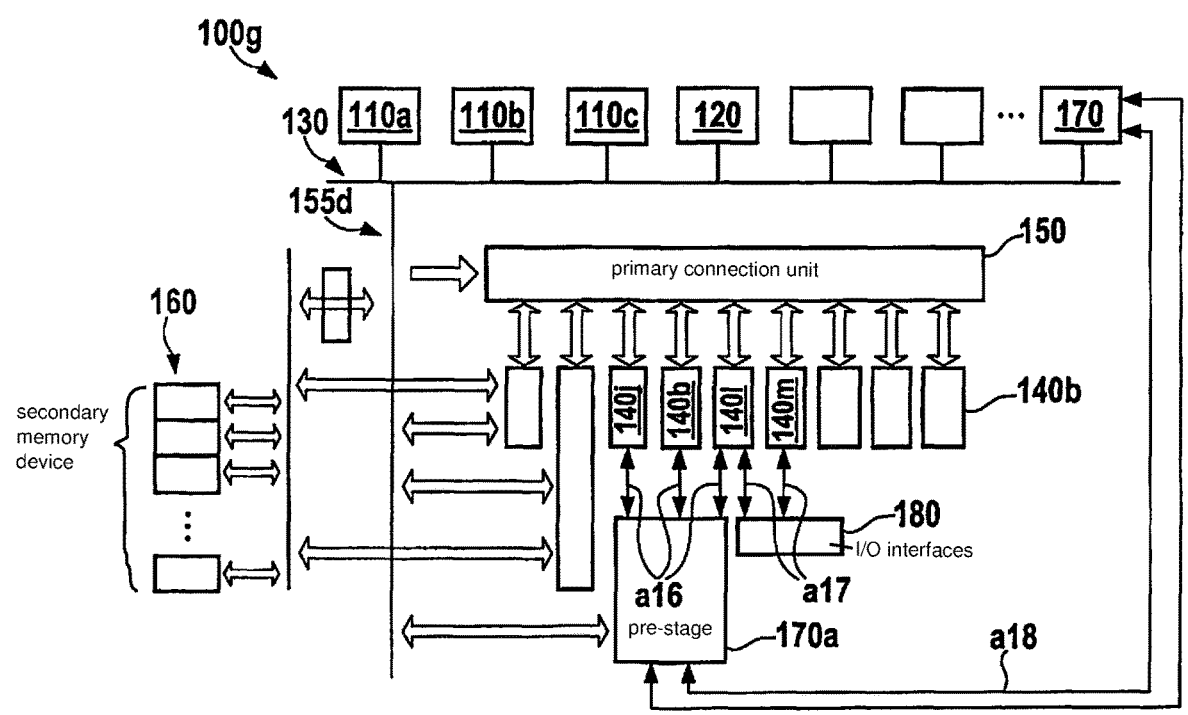

FIG. 1G shows another specific embodiment 100*g* of the processing unit according to the present invention. Also depicted in FIG. 1G is an interrupt order router device (interrupt router) 170 of processing unit 100*g*, which routs interrupt orders (interrupts) between components of processing unit 100*g* in a conventional manner.

In the present specific embodiment, it is provided that at least one of functional units 140*j* and, in particular, data flow control unit 140*b*, includes at least one, in particular, direct data connection to interrupt router 170 of processing unit 100*g* implemented preferably solely via a pre-stage 170*a* situated within flexible hardware extension 1500, cf. arrows a16. This advantageously offers the possibility that relevant functional unit 140*j* and, in particular, data flow control unit 140*b* may directly impact the processing of interrupts within processing unit 100*g* or within their interrupt router 170 via a16, via 170*a*, via a18, for example, in order to generate or otherwise influence (for example, to mask) interrupts.

Pre-stage 170*a* situated in flexible hardware extension 1500 may be configured and/or reset and/or otherwise set or read out by the components of processing unit 100*g*, in particular, by processing cores 110*a*, 110*b*, 110*c*, preferably via second connection unit 155 (or 155*d* in FIG. 1G), in particular by accessing registers situated within pre-stage 170*a*. A specific embodiment without pre-stage 170*a* is also possible, so that the signals of functional units 140*j* and, in particular, data flow control unit 140*b* are guided directly to interrupt router 170 (arrows a16 and a18 transition directly into one another).

It is also possible in another specific embodiment that a functional unit 140*j* and, in particular, data flow control unit 140*b* is designed to receive interrupts from interrupt router 170, if necessary via pre-stage 170*a*, cf. arrows a16, a18. This advantageously offers the possibility of sending interrupts from the additional components of processing unit 100 via 170 and, if necessary, 170*a* to functional unit 140*j* and, in particular, to data flow control unit 140*b*, in order to influence its operation or to change its configuration.

In another advantageous specific embodiment, it is provided that at least one of functional units 140*l*, 140*m* and, in particular, data flow control unit 140*b*, includes a, in particular, direct data connection a17 to an input interface and/or to an output interface (or to a combined input/output interface) of processing unit 100*g*. Input and output interfaces are, for example, simple digital pins or analog pins or analog/digital pins (I/O pins) or else interfaces that are made up of one or multiple pins and in their shared interaction, for example, operate a specific communication protocol. Such input and output interfaces of processing unit 100*g* are represented by way of example in FIG. 1G by block 180. This advantageously offers the possibility that a functional unit 140*l*, 140*m* and, in particular, data flow control unit 140*b* receives input signals from input interface 180 of processing unit 100*g* or outputs output signals via output interface 180 of processing unit 100*g*, for example, to units (not shown) situated externally to processing unit 100*g*.

In another advantageous specific embodiment (not shown), 180 may be separated into a part 180*a* that receives or sends the data, and a part 180*b* that operates the communication protocol of the interface. 180*a* in this case is linked directly to functional units 140*l*, 140*m* and, in particular, to data flow control unit 140*b*. 180*b* may be located inside or outside flexible hardware extension 1500. 180*b* may be advantageously shared with additional components of processing unit 100*g*.

Details relating to a structure of the functional units according to the present invention are described in greater detail below with reference to FIGS. 2A, 2B, 2C. For this purpose, FIG. 2A schematically shows as simplified block diagram of a functional unit 1400 according to one specific embodiment of the present invention. The structure of functional unit 1400 described below with reference to FIG. 2A may, for example, be present in the manner depicted in FIG. 2A or at least in a similar manner in one or multiple or all of aforementioned functional units 140, 140*a*, 140*q* and described with reference to FIGS. 1A through 1G. It is understood that according to other specific embodiments, deviations from the structure described in FIG. 2A are also possible.

Functional unit 1400 includes an input interface 1402 for receiving first data, which are transmitted, for example, from another functional unit (not shown) to functional unit 1400 according to FIG. 2A. For the further description of FIG. 2A, it is assumed, for example, that functional unit 1400 includes at least one data connection via its input interface 1402 to a primary connection unit 150 (cf. FIG. 1A), primary connection unit 150 preferably including a crossbar switch 152*a*. A corresponding output interface of crossbar switch 152*a*, which is connected to input interface 1402 of functional unit 1400, is symbolized in FIG. 2A by rectangle 1502 drawn with dashed lines. Initial input data, which may be fed to input interface 1402 of functional unit 1400 via output interface 1502 of crossbar switch 152 (FIG. 1A), are identified in FIG. 2A with block arrow a20.

In another advantageous specific embodiment, it may be provided that functional unit 1400 may be fed multiple input data, in particular, simultaneously, which is indicated in FIG. 2A by block arrow a21 drawn with dashed lines, and by the dots between block arrows a20, a21. In one specific embodiment, many input interfaces 1402 (not shown), for example, may be provided for the simultaneous or parallel receipt of input data.

In one specific embodiment, it is provided that input interface 1402 is designed for receiving first data or input data in the form of data packets. The data packets may, for example, have a format, which is specific to a communication between multiple functional units 1400 according to the present invention.

In other specific embodiments (not shown), it may also be provided that a functional unit 1400 includes multiple input interfaces 1402 of the type described above. Input interface 1402 may, for example, also be referred to as a functional unit-specific input interface, because it is provided specifically for, preferably direct, mutual data communication between various functional units. A direct data communication between functional units is understood here to mean a data communication which, in addition to the functional units involved, includes if need be also a primary connection unit 150, for example, with crossbar switch 152, but not, for example, main connection unit 130 of processing unit 100 according to the present invention (FIG. 1A).

Alternatively, it is also possible in other specific embodiments (not shown), that a functional unit includes no input interface 1402 at all of the type described above, i.e., no functional unit-specific input interface at all. Accordingly, a functional unit configured in such a way is unable to receive any input data from another functional unit via aforementioned input interface 1402. Such a functional unit may, however, be designed to upload data from another source, for example from primary memory device 120 of the processing unit via connection a9 (FIG. 1F) and/or from secondary memory device 160; cf. FIG. 1F. Such data may be uploaded from another source via a correspondingly configured different interface, for example, via a direct data connection, for example, between the functional unit and secondary memory device 160, as symbolized in FIG. 1F by block arrow a12. Such a different interface is also indicated in FIG. 2A by block arrow a24 drawn with dashed lines.

In one preferred specific embodiment, the functional unit is designed to read in a predefinable quantity of data words via interface a24, or to output to this interface, for example, at least one data word or else, for example N many data words, where N>=1. This may take place preferably autonomously, i.e., without the need for a (re)configuration of the functional unit or for an interaction of the functional unit with other components, before data words to be read in or to be output have been read or written. The functional unit may optionally also be designed to output pieces of information that characterize the read-in or output quantity of data words to a downstream functional unit.

The functional unit may optionally also be designed to output data to a downstream functional unit, either once, for example, after completion of the entire memory operation, or also once or multiple times, after completion of parts of the (comprehensive) memory operation, respectively. These data output to a downstream functional unit may, for example, contain pieces of information about the instantaneous progress and/or memory addresses and/or offsets, or else they may also be removed from the functional unit.

Functional units 1400 according to other specific embodiments may be advantageously designed in such a way that the initial input data received by the functional unit via input interface 1402 are output via interface a24 unchanged or in processed form, in particular, to secondary memory device 160 and/or in particular, also to one of the remaining components of processing unit 100, in particular, to primary memory device 120 or to other peripheral components 125.

Functional unit 1400 according to one specific embodiment includes an output interface 1404 for outputting output data. Output data are formed, for example, by functional unit 1400 as a function of the first data received via input interface 1402 and are output as second data via output interface 1404, for example, to one or multiple other functional units (not shown in FIG. 2A). In some specific embodiments, a data output from functional unit 1400 via its output interface 1404 to itself, for example, via its input interface 1402, is also possible. The output data are symbolized by block arrow a22 in FIG. 2A. Output interface 1404 is also particularly advantageously linked to crossbar switch 152*a* (FIG. 1A); cf. input interface 1504 of crossbar switch 152*a* symbolized by a rectangle depicted with dashed lines in FIG. 2A.

In other specific embodiments (not shown), it may also be provided that a functional unit includes multiple output interfaces 1404 of the type described above. For example, output interface 1404 may also be referred to as a functional unit-specific output interface, because it is provided specifically for, preferably direct, data communication between various functional units among each other.

In another advantageous specific embodiment, it may be provided that functional unit 1400 may output, in particular, simultaneously, multiple pieces of output data, which is indicated in FIG. 2A by block arrow a23 drawn with dashed lines, as well as by the dots between block arrows a22, a23.

A corresponding number of output interfaces 1404 may be provided for the simultaneous or parallel output as described above.

Alternatively, it is also possible in other specific embodiments (not shown) for a functional unit to include no output interfaces 1404 at all of the type described above, i.e. no functional unit-specific output interface at all. Accordingly, a functional unit configured in this way may not output any output data to other functional units via aforementioned output interface 1404. However, such a functional unit may, for example, be designed to output data to another unit, for example, by writing into primary memory device 120 of the processing unit, for example, via connection a9 (FIG. 1F), and/or into secondary memory device 160, for example, via connection a12; cf. FIG. 1F. Such data may be written via a correspondingly configured different interface, for example, via a direct data connection between the functional unit and secondary memory unit 160, as is symbolized by block arrow a12 in FIG. 1F. Such a different interface is also indicated in FIG. 2A by previously mentioned block arrow a24 drawn with dashed lines.

Functional units 1400 may be advantageously designed in other specific embodiments in such a way that the data received by the functional unit via interface a24 are output via output interface 1404 unchanged or in processed form to one or multiple downstream functional units 1400, in particular, data from secondary memory device 160 and/or, in particular, also from the remaining components of processing unit 100, in particular, of primary memory device 120 or from other peripheral components 125 being read in with the aid of interface a24.

Functional unit 1400 further includes a local control unit 1410, which is designed to control an operation of functional unit 1400. Local control unit 1410 may, for example, include at least one state machine 1410a. In alternative specific embodiments, local control unit 1410 may also include other, preferably permanently wired hardware circuits.

In another particularly preferred specific embodiment, local control unit 1410 may also be assigned a local reconfiguration device 1412, which enables a configuration or reconfiguration of functional unit 1400, in particular, also dynamically, i.e. during the operation of functional unit 1400. In another specific embodiment, it is also possible to map the functionality of local reconfiguration device 1412 via a corresponding part of state machine 1410a or of local control unit 1410.

In another specific embodiment, reconfiguration device 1412 is designed to take into account the possible configuration variants of relevant functional unit 1400 during a configuration or reconfiguration and/or to ensure that a configuration originates from a defined, applicable starting point or starting condition, and/or that a reconfiguration does not impede or unintentionally interrupt instantaneously running calculations or other functions of functional unit 1400.

In another advantageous specific embodiment, the functional unit includes a local calculation unit 1420. According to another advantageous specific embodiment, local calculation unit 1420 may include at least one coarse-grained hardware element or may be designed as a coarse-grained hardware element. In this case, local reconfiguration device 1412 may advantageously control, for example, a configuration or reconfiguration of the coarse-grained hardware elements.

For example, conventional hardware-configurable logic circuits such as, for example, FPGAs or CPLDs, include mostly only fine-grained hardware elements, whose configuration may only be changed via external specifications. Such conventional hardware-configurable logic circuits are therefore to be considered as (integrated) circuits, which may be programmed in a special programming phase at the hardware level. This applies also to FPGAs with the possibility of partial reconfiguration. Here, an appropriate number of function-determining reconfiguration possibilities are reserved, which are changed according to external specifications, the relevant FPGA parts being correspondingly reprogrammed and interconnected with the aid of a partial reconfiguration in a respectively specific reprogramming phase. In the process, the reconfigured FPGA parts change the logic function itself.

In contrast, functional unit 1400 according to the present invention represents a calculation unit or a component of a calculation unit, whose elements, for example, coarse-grained hardware elements, may be configured internally by functional unit 1400 itself or by its local control device 1410 and, for example, be re-interconnected with one another in the function, for example, by using and appropriately adjusting multiplexers. It may also be provided that another component of processing unit 100 (FIG. 1A), for example, a processing core 110a, configures functional unit 1400 or its components.

Another aspect of the configurability according to the present invention exists as a result of the influence of the communication and of the data flow between various functional units 140, 140a, 140b (FIG. 1A), which may be controlled, for example, by corresponding configuration of the respective functional units, and/or by controlling the operation of primary connection unit(s) 150 that connect the respective functional units, cf. FIG. 1A.

In one specific embodiment, the internal function, for example, the logic function, of individual coarse-grained hardware elements or other elements of functional unit 1400 is permanently wired in each case and therefore does not change, in contrast to conventional hardware configurable logic circuits. In such case, the data flow between various functional units may be influenced as described above in order to achieve a reconfiguration.

In some specific embodiments, a reconfiguration of the processing unit according to the present invention or at least one of its functional units 1400 may be controlled, carried out and, if necessary, monitored by processing unit 100 or control device 1410 integrated in relevant functional unit 1400 itself, i.e., from the inside out. Functional unit 1400 may thus reconfigure itself independently and automatically.

A configuration or reconfiguration may particularly preferably take place during the operation of processing unit 100 or of functional unit 1400, for example, as a component of an overall algorithm, which is to be evaluated by one or multiple of functional units 1400, 140, 140a, . . . . It may be advantageously provided that functional units 1400, for example, 140a and 140b, configure other functional units 1400, for example, 140c and 140d or their components, in order, for example, to implement such a comprehensive overall algorithm.

In one preferred specific embodiment, it is provided that functional unit 1400 reconfigures itself, in particular, when a predefinable processing segment or a predefinable calculation task has been carried out or has been completed and the corresponding resources of the functional unit for this calculation task are not further needed. In this case, functional unit 1400 may advantageously change its configuration itself, for example, in such a way that it is suitably configured for a subsequent processing segment or a subsequent calculation task.

According to other specific embodiments, algorithmically upstream functional units 1400 advantageously build on this reconfiguration of algorithmically downstream functional units 1400 and are able to send the downstream functional units additional data to be processed upon conclusion of a processing segment without explicit reconfiguration measures.

In one advantageous embodiment, a functional unit 1400, for example, 140*a*, which sends the data to another functional unit 1400, for example, 140*b*, may then upon completion of a processing segment instruct another functional unit 1400, for example, 140*c*, to send the data to functional unit 140*b*. Due to the aforementioned reconfiguration, functional unit 140*c* may continue to seamlessly send data to functional unit 140*b*.

In another advantageous specific embodiment, local calculation unit 1420 may include at least one of the components: an adder, a multiplier, a divider, a shift register, a barrel shifter, a comparator, a multiplication accumulator (MAC), an arithmetic logic unit (ALU), a memory unit, a register, a multiplexer, a demultiplexer, an interface, in particular, a communication interface, a memory access unit (for example, DMA unit), a unit for calculating exponential functions, a unit for calculating logarithmic functions, a unit for calculating exponential functions, a unit for calculating root functions, a unit for calculating trigonometric functions, a lookup table or lookup tables. Combinations of these are also possible in other specific embodiments. One or multiple of the aforementioned components may preferably be situated in calculation unit 1420 of functional unit 1400 according to the present invention.

Accordingly, calculation unit 1420 may carry out calculations on the input data fed to functional unit 1400 and may output again results obtained therefrom, for example, as output data. A data flow for this process takes place preferably via input interface 1402 (receipt of input data), via calculation unit 1420 (implementation of the calculations), via output interface 1404 (output of output data). This data flow is characteristic for the calculation and processing of data inside of a functional unit 1400.

Outside of functional unit 1400, the data flow according to one preferred specific embodiment may be influenced by the specification, to which (additional) functional unit output data of a first functional unit are to be forwarded, which is achievable by a corresponding control of primary connection unit 150. The control of primary connection unit 150 may advantageously be set once and thus permanently for a particular period of time. It may also be advantageous to hinge the control of primary connection unit 150 on control data, which are also sent with individual packets or also with each packet, in particular, by indicating a target functional unit 1400.

According to other specific embodiments, multiple functional units, for example, of the type depicted in FIG. 2A, may be provided, which include identically or differently configured calculation units 1420, if more complex calculations are to be carried out. A data flow of data between the various functional units in this case may be advantageously defined by an algorithm or by the structure of the more complex calculations to be carried out.

In another advantageous specific embodiment, it is provided that functional unit 1400 includes a local configuration memory 1430. Local configuration memory 1430 may particularly preferably include a register memory, local configuration memory 1430 including at least one, advantageously however, a plurality of configuration registers 1432*a*, 1432*b*, 1432*c*, 1432*d*.

In another specific embodiment, the local configuration memory may also be represented by a SRAM or by a combination of a register memory and a SRAM. The specific embodiment including a SRAM as a register memory is summarized below.

With local configuration memory 1430, an efficient configuration and reconfiguration is possible, even during the operation of functional unit 1400, for example, by modifying one or multiple configuration registers 1432*a*, 1432*b*, 1432*c*, 1432*d* in the desired manner. Configuration registers 1432*a*, 1432*b*, 1432*c*, 1432*d* may, for example, be modified by functional unit 1400 itself and/or by another functional unit (not shown).

It is further possible that in other specific embodiments a modification of the configuration registers of a functional unit 1400 by other components of processing unit 100 (FIG. 1A), for example, by a processing core 110*a*, is possible, by writing data corresponding to relevant component 110*a* into the configuration register or configuration registers of functional unit 1400.

In another advantageous specific embodiment, it is provided that functional unit 1400 includes a local functional memory 1440. Local functional memory 1440 may particularly preferably include a register memory or represent a part of a register memory. Local functional memory 1440 may, in particular, include at least one functional register 1442*a*. Local functional memory 1440 may advantageously be used for at least temporarily storing input data and/or output data of functional unit 1400 or intermediate results of calculations of functional unit 1400, as they are carried out by calculation unit 1420.

In another advantageous specific embodiment, it is also possible to equip functional unit 1400 with a multitude of register memories, a first number of register memories being usable as configuration registers 1432*a*, 1432*b*, 1432*c*, 1432*d*, and a second number of register memories being usable as functional register 1442*a*.

In other specific embodiments, it is further possible that for various configuration possibilities of a functional unit 1400, the first number of required register memories or the second number of required register memories is varied and is changeable, for example, by a main configuration. In this way, an operation of functional unit 1400 may be very flexibly designed and, in particular, the local (register) memory may be dynamically adapted to calculations to be carried out by functional unit 1400.

In one preferred specific embodiment, a particular data structure, for example, in the form of a data packet, is provided for exchanging data between various functional units 1400. FIG. 2B schematically shows a simplified depiction of a data structure DS for such data packets according to one specific embodiment. Data structure DS includes an address field ADR. Address field ADR is subdivided into a first address ADR1, which specifies a particular functional unit, for which the data packet that includes data structure DS is intended.

An optional second address ADR2 defines a target address inside the functional unit determined by first address ADR1, which may advantageously influence in which local memory space of the target functional unit data contained in the data packet are stored. Second address ADR2 may, for example, be used to address particular memory registers of the target functional unit.

In embodiments of the processing unit according to the present invention, which include, for example, several tens of functional units 1400, a few bits, for example, approximately the bits 10 through 5 (i.e., for example, six bits)

normally suffice in order to define first address ADR1. Something comparable applies to the "internal addressing" with the aid of second address ADR2 with respect to the memory registers available in functional units 1400, which in one specific embodiment are selected, for example, by the bits 4 through 0.

Data structure DS may further optionally include a data field DAT, which includes input data, for example, for calculation by the target functional unit and/or configuration data, which are provided, for example, for controlling a configuration of the target functional unit.

In other specific embodiments, it is also possible for data packets to be exchanged between functional units, which contain an empty data field DAT, i.e., neither input data for a calculation nor configuration data for the target functional unit. This may be of importance, for example, for a synchronization of different functional units.

Control data may optionally also be contained in data structure DS, which may be situated in the data field referred to by the reference symbol CTRL. This may involve, for example, additional control data (i.e. in addition to the configuration data which, if necessary, are contained in data field DAT), for example, pieces of status information, pieces of safety information, pieces of information relating to a loop depth or recursion depth in a nested implementation of loops or recursive calculations. Alternatively or in addition, control data CTRL may also contain pieces of parity information and/or checksums and the like. Combinations of the aforementioned pieces of information for the control data are also possible.

In another specific embodiment, it is also possible to design functional unit 1400 from FIG. 2A as a data flow control unit 140b according to the present invention (FIG. 1A). In this case, functional unit 1400 may, for example, include an evaluation unit 1490, which controls the operation of the data flow control unit, for example, within the context of the implementation of the method according to FIG. 5.

The data flow control unit or its evaluation unit 1490 may, for example, be designed to receive input data from other functional units 140, for example, via input interface 1402, or from external components 200 (see data connection a90 from FIG. 2C).

The data flow control unit or its evaluation unit 1490 may, for example, be designed for outputting output data to other functional units 140 via output interface 1404, and/or to external components 200 (FIG. 2C).

The input data and/or output data according to preferred specific embodiments may be at least one of the following types: data values, for example, constants, start values, values and intermediate results of an algorithm, status values (timer values, loop counters, loop level, ready, waiting, valid, acknowledge, error, triggers (for example, start, enable, interrupt, output data, for example, for configuring, reconfiguring of functional units 140, output data, for example, for configuring, reconfiguring of primary connection unit 150.

In another preferred specific embodiment, at least one functional unit 1400 (FIG. 3A) is designed to exchange, i.e. to send or to receive, data with at least one other functional unit in the format referred to above with reference to FIG. 2B, i.e. in the form of data packets having data structure DS.

In another preferred specific embodiment, a newly arriving configuration, which relevant functional unit 1400 receives, may be selectively (for example, always) immediately written into local configuration memory 1430 or (for example, always) rejected if a new configuration is not (yet) possible or (for example, always) is held back until functional unit 1400 is prepared to receive a new configuration in accordance with the rules, or (for example, always) is temporarily stored in a buffer, which, if necessary, is read out only if functional unit 1400 is prepared to receive a new configuration according to the rules. In the second to last case or in the last case, if the buffer is full, a blockade of the input data advantageously takes place, which prevents a further writing into functional unit 1400 with local configuration memory 1430 until the data may be processed. The blockage is very advantageously also utilized as a synchronization means between at least two functional units 1400.

In another specific embodiment, at least one of the functional units, as already indicated above, is designed as a hardware circuit, in particular, completely as a hardware circuit. As a result, it is advantageously possible to particularly quickly and efficiently carry out calculations, logic operations, storage operations and other functions provided by the relevant functional unit such as, for example, the implementation of look-up tables, characteristic curves and/or characteristic diagrams.

In another advantageous specific embodiment, it is provided that at least one of the functional units includes at least one of the following elements: a microcontroller, a processing core that executes a software (for example, a processing core that is designed to execute software), a digital signal processor (DSP), a programmable logic circuit (for example, a FPGA, field programmable gate array), an application-specific integrated circuit (ASIC), in particular, an integrated circuit prefabricated by a gate array and/or a transistor array but not yet application-specifically wired, which is application-specifically wired, for example, only in a later fabrication step, and which may be referred to, for example, as "sea-of-gates." In this way, special functions may, if necessary, be implemented inside a functional unit according to the present invention. The function of such functional units to be carried out may, in particular, be established at a later point in time and/or changed with comparatively little effort.

A comparatively small microcontroller at least partially programmable with the aid of software may be contained in a particular functional unit in order to provide a flexibility, required if necessary, for some specific applications and/or to be able to represent a higher complexity. In this case as well, the previously described advantages with respect to the unburdening of main connection unit 130 as well as processing cores 110a, 110b, 110c of processing unit 100, 100a, 100b, 100c, 100d, 100e, 100f, 100g according to the present invention arise as a result of the interplay of the multiple functional units among themselves.

In one particularly preferred specific embodiment, it is provided that all functional units are designed as hardware circuits, in particular, completely as hardware circuits. This results in a particularly efficient, powerful and small dimensioned arrangement.

In other specific embodiments, it is possible for one or multiple functional units to be designed as hardware circuits, in particular, completely as hardware circuits, and for at least one component not designed completely as a hardware circuit or another component in the form of at least one additional functional unit to be provided. In one particularly preferable specific embodiment, for example, a first number of functional units may be provided, which are designed completely as hardware circuits, and an additional functional unit may, for example, include a microcontroller or a programmable logic module or a programmable logic circuit or a comparatively easily changeable logic circuit.

In another preferred specific embodiment, at least one of the functional units, as previously described above, includes at least one coarse-grained hardware element. Alternatively or in addition, at least one of the functional units may be designed as a coarse-grained hardware element.

The term coarse-grained in the present case means that the relevant hardware element includes more than one logic gate or is formed from more than one logic gate. The gates according to one specific embodiment are unchangeable among themselves in function and/or in connection.

Thus, coarse-grained hardware elements are understood, in particular, to mean elements, each of which is automatically able to carry out complex arithmetic operations, in particular, without the need for an additional data exchange among themselves for the calculation after the data are sent and received via output interfaces and input interfaces 1402 and 1404 in the manner described above. For example, the individual coarse-grained hardware elements are each designed as one of the following elements: higher complex elements, such as an arithmetic-logical unit (ALU), a memory access unit, a communication interface and/or less complex units, such as a comparator, an adder, a multiplier, a divider, a shift register, a barrel shifter, a multiplication adder ("Multiply-Accumulate" (MAC)), an exponential unit, a logarithmic unit, a trigonometric unit, a register or a block register, a memory unit (for example, a RAM, a Flash, etc.), a multiplexer (for example, 2:1-MUX, M:N-MUX).

Figure 3A:
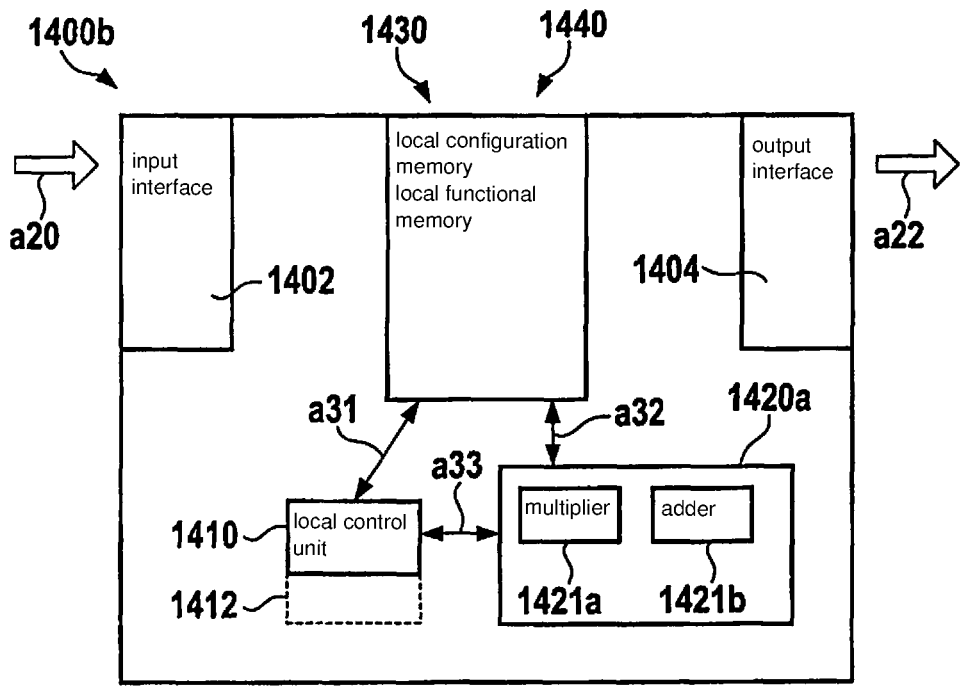
FIGS. 3A, 3B each schematically show a simplified block diagram of a functional unit according to another specific embodiment of the present invention.

FIG. 3A schematically shows a simplified block diagram of a functional unit 1400b according to another specific embodiment of the present invention. Functional unit 1400b is configured to implement the functionality of a multiplication accumulator (MAC). In this case, for example, three input variables A, B, C are defined, which are evaluated according to the following equation and thus result in the output variable Y being Y=A*B+C, "*" defining the multiplication operator. The input variables A, B, C may be fed to functional unit 1400b via input interface 1402, for example, via at least one data packet contained in input data a20, and the output variable Y may be output by functional unit 1400b to at least one additional functional unit (not shown) as data packet a22 via output interface 1404, as previously described multiple times above. The arithmetic steps of multiplication, addition required for evaluating the aforementioned equation may be carried out by local calculation unit 1420a of functional unit 1400b. For this purpose, local calculation unit 1420a, for example, has a multiplier 1421a designed preferably as a hardware circuit, and an adder 1421b, also designed preferably as a hardware circuit, which may also be converted according to other specific embodiments into a multiplication accumulator 1420a that is shared and designed preferably as a hardware circuit, without separation into 1421a and 1421b, for the purpose of an even more efficient implementation. Remaining components 1410, 1412, 1430, 1440 of functional unit 1400b may be designed identically to the configuration according to FIG. 2A. In other specific embodiments, however, remaining components 1410, 1412, 1430, 1440 may also be designed differently from the configuration according to FIG. 2A.

Figure 3B:
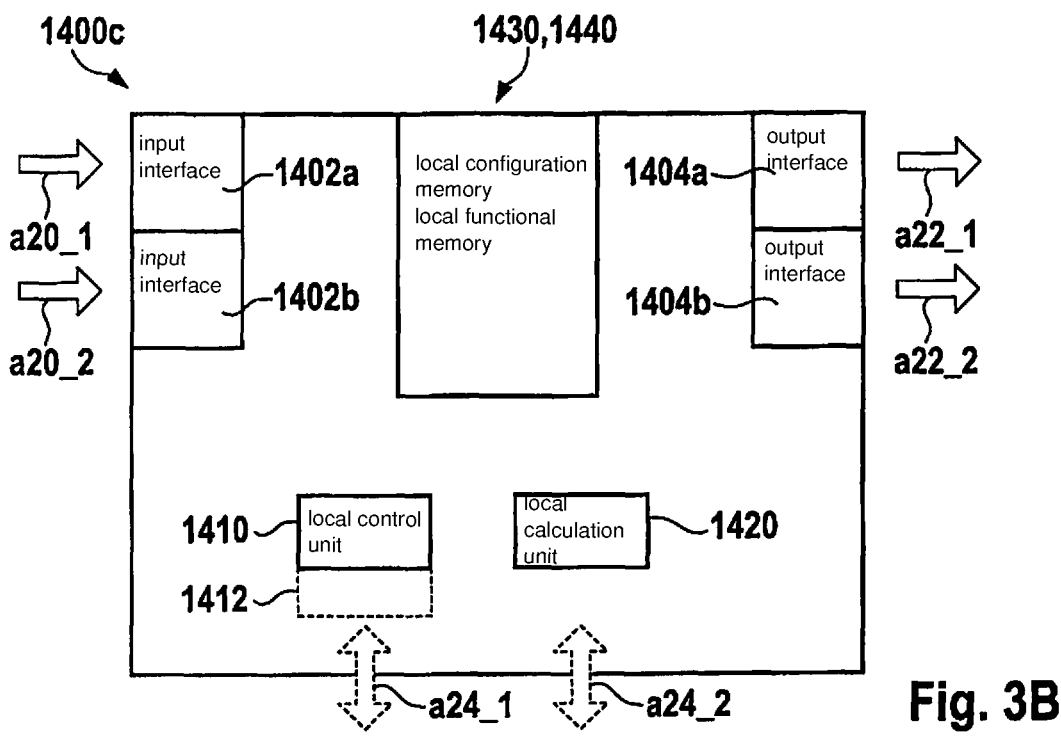

FIG. 3B schematically shows a simplified block diagram of a functional unit 1400c according to another specific embodiment of the present invention. Functional unit 1400c is provided, for example, to receive data in parallel from two additional functional units 1400, each having an output interface 1404 or from another functional unit 1400 having two output interfaces 1404 in parallel, which in turn upload the data, for example, from secondary memory device 160 (FIG. 1F). For this purpose, functional unit 1400c may, for example, include two input interfaces 1402a, 1402b of the type 1402 described above with reference to FIG. 2A, so that functional unit 1400c may be fed input data via two input interfaces in parallel. The data may be particularly preferably received via the two input interfaces independently of one another. Alternatively, data having double the data width or double the word width may be received using the two input interfaces 1402a, 1402b, first input interface 1402a, for example, receiving the low-order bits a20_1 of the data and second input interface 1402b, for example, receiving the higher-order bits a20_2 of the data. In one particularly efficient variant of aforementioned multiplication accumulator 1440b (MAC, FIG. 3A), input variables A, B, C could, for example, be fed to calculation unit 1420a via three input interfaces 1402 in parallel (only one input interface 1402 is depicted).

According to another exemplary embodiment, functional unit 1400c may be provided to output data to a data sink. For this purpose, functional unit 1400c may, for example, include two output interfaces 1404a, 1404b of the type 1404 described above with reference to FIG. 2A, so that two writing operations in parallel are possible. The two writing operations may be particularly preferably carried out independently of one another. Alternatively, data having double the data width or double the word width may be output using the two output interfaces 1404a, 1404b, first output interface 1404a, for example, outputting low-order bits a22_1 of the data, second output interface 1404b, for example, outputting higher-order bits a22_2 of the data.

According to another exemplary embodiment, functional unit 1400c may be provided for uploading data from a data source such as, for example, secondary memory device 160 (FIG. 1F), or for writing data into this data source. For this purpose, functional unit 1400c may include, for example, two different interfaces a24_1, a24_2 of type a24 described above with reference to FIG. 2A, so that two reading operations in parallel or two writing operations in parallel or one reading and writing operation in parallel or two reading operations in parallel, together with two writing operations in parallel are possible. The reading operations/writing operations may be particularly preferably carried out independently of one another.

Alternatively, data having double the data width or double the word width may be read in or written using the two different interfaces a24_1, a24_2, first different interface a24_1, for example, reading or writing the lower-order bits of the data and second different interface a24_2, for example, reading or writing the higher-order bits of the data.

In other specific embodiments, a differing number of input interfaces 1402 or output interfaces 1404, as well as different interfaces a24 is/are also possible for the functional unit according to the present invention.

A significant advantage of the present invention is that functional units 140, 140a, . . . , 140q, 1400, 1400a, 1400b, 1440c are able to actively, directly and autonomously communicate and exchange data with one another (without the requirement of a control by the processing core of the processing unit, for example). This is advantageously achieved in one specific embodiment in that the functional units are able to output data packets, in particular, functional unit-specific data packets, to other functional units. This is advantageously achieved in another specific embodiment in that the functional units are able to receive data packets, in particular, functional unit-specific data packets, from other functional units.

The functional units according to another specific embodiment may particularly preferably themselves determine to which additional functional unit or data sink output data of the functional unit, for example, in the form of one or multiple data packets, are output. Such a determination may also be made dynamically, i.e., during the runtime of the functional unit. Address field ADR of data structure DS (FIG. 2B), for example, may be used for such purpose, the data being dynamically output to respectively different functional units or data sinks during the runtime.

Apart from the functional units and from a primary connection unit 150 connecting them, no additional component of processing unit 100 is particularly advantageously required in order to enable the corresponding data exchange between the functional units. No unit superordinate to the functional units, in particular, such as, for example, a processing core 110$a$, is required in order to enable the data exchange. Nor is any unit superordinate to functional unit 1400 particularly advantageously required in order to ascertain a respective target for output data of a functional unit during the runtime of the functional units, because in preferred specific embodiments, this task may be assumed by local control unit 1410 (FIG. 2$a$), or the specification of a target address may be derived from input data and configuration data received via input interface 1402.

Another advantage of the functional units according to the present invention is that they carry out their calculation task(s) as soon as they are correctly configured and fed corresponding input data. In one preferred specific embodiment, the calculation data and output data of a functional unit are a function of the functionality of local calculation unit 1420, as well as of local control unit 1410 in connection with local reconfiguration device 1412; compare in this regard, for example, the exemplary embodiment with the multiplication accumulator described above with reference to FIG. 3A.

In other advantageous specific embodiments, the calculation data or output data of the functional unit may be a function of the configuration of the functional unit, of the fed input data and, if necessary, of additional input data or input signals, which may be fed to the functional unit, for example, via additional input interfaces; compare, for example, the data connection via different interface a24 according to FIG. 2A and/or direct data connection a34 according to FIG. 2C. If, for example, a direct data connection a34 is provided between the functional unit and an external component 200 (FIG. 2C), values of a register mirrored by the external component 200 to the functional unit may, for example, also influence the output data of the functional unit.

The design of the functional unit according to the present invention including defined input interfaces 1402 and output interfaces 1404 advantageously enables a particularly simple and efficient data flow, which may also be easily analyzed, in particular, with respect to a chronological sequence of the relevant data transmissions. In addition, a nesting of read accesses and write accesses is advantageously avoided as a result and a particularly deep pipelining is enabled, both inside individual functional units as well as in data flow chains including multiple functional units.

Figure 4A:
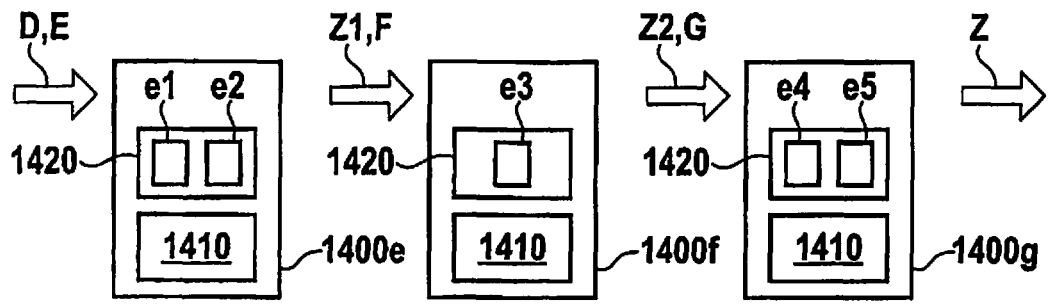
FIGS. 4A, 4B, 4C each schematically show a data flow according to one specific embodiment.

FIG. 4A shows by way of example a data flow chain including a total of three different functional units 1400$e$, 1400$f$, 1400$g$ for illustrating a data processing inside the processing unit according to the present invention that includes multiple functional units. The depicted data flow chain serves on the whole to evaluate the equation $Z=D*\exp(E)+F*\sin(G)$, exp( ) representing the exponential function, sin( ) representing the sinus function, D, E, F, G representing input data, and Z representing output data obtained by evaluating the equation. For the sake of clarity, only local control unit 1410 and local calculation unit 1420 are depicted for each of the individual functional units. The additional internal structure of at least one of the functional units may, for example, be identical to or at least similar to the configuration depicted in FIG. 2A. To evaluate exponential function exp(E), local calculation unit 1420 of functional unit 1400$e$ includes a unit e1 for calculating the exponential function. Local calculation unit 1420 of functional unit 1400$e$ further includes a multiplier e2 for calculating the expression D*exp(E). Functional unit 1400$e$ is fed parameters D, E as input data and as output data, functional unit 1400$e$ supplies intermediate result Z1=D*exp(E). This intermediate result Z1, like parameter F, is fed as input data to additional functional unit 1400$f$. Local calculation unit 1420 of functional unit 1400$f$ includes an adder e3, which ascertains the additional intermediate result Z2=Z1+F. The additional intermediate result Z2, like parameter G, is fed as input data to additional functional unit 1400$g$. Local calculation unit 1420 of functional unit 1400$g$ includes a unit e4 for calculating sinus function sin(G) as well as an adder e5, which ascertain end result Z as a function of data Z2, G, which may finally be output via the output interface (not shown) of functional unit 1400$g$.

According to other embodiments, the configuration depicted in FIG. 4A may particularly advantageously carry out the calculations of a data stream in a pipeline structure. The data of the data stream, thus input data D, E, F, G as well as intermediate results Z1, Z2 and result Z, receive in the process an index "i", "i−1", "i−2", "i+1", "i+2", etc., which is identical for all D, E, F, G, Z1, Z2, Z depending on the logical connection, for example, Z[i]=D[i]*exp(E[i])+F[i]+sin G[i] as well as Z[i−1]=D[i−1]*exp(E[i−1])+F[i−1]+sin (G[i−1]), as well as Z[i−2]=D[i−2]*exp(E[i−2]=F[i−2]+sin (G[i−2]).

Figure 4B:
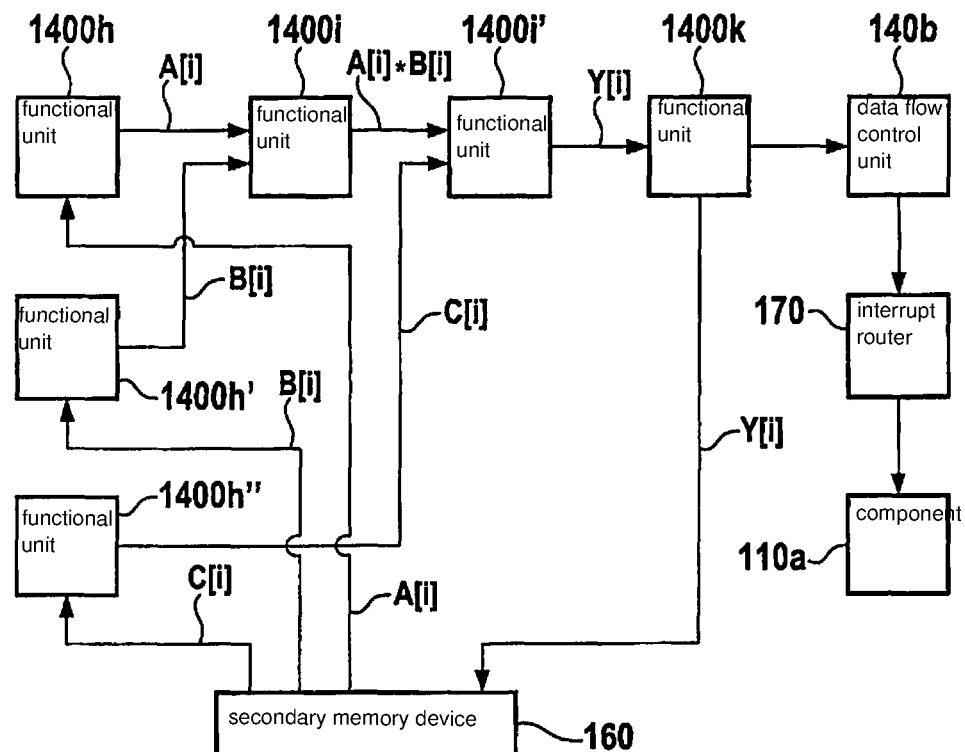

FIG. 4B shows by way of example, the schematic interaction of functional units according to another specific embodiment. The configuration depicted is designed, in particular, for carrying out algorithm Y[i]=A[i]*B[i]*C[i]. Three functional units 1400$h$, 1400$h'$, 1400$h''$ are provided, each of which is designed to read out input data present for example in the form of vectors A[i], B[i] and C[i] from secondary memory device 160 ("memory read-functional units"). Functional unit 1400$h$ is designed, for example, to read out input data vector A[i] from secondary memory device 160. Vectors A[i] and B[i] are sent from memory read-functional units 1400$h$, 1400$h'$ to a first multiplication functional unit 1400$i$ designed to carry out multiplications. Result A[i]*B[i] of multiplication functional unit 1400$i$ and of vector C[i] uploaded from memory read functional unit 1400$h''$ are sent to a second multiplication functional unit 1400$i'$. The result of the second multiplication functional unit 1400$i'$ is vector Y[i]=A[i]*B[i]*C[i], which is stored in second memory device 160 via a memory write functional unit 1400$k$. After the last data word of vector Y[i] is written into secondary memory device 160, memory write functional unit 1400$k$ sends a corresponding data word to functional unit 140$b$ designed as a data flow control unit, which then lastly sends, for example, an interrupt order to an interrupt order router device 170, as a result of which, in turn, a processing core 110$a$ of the processing unit is notified of the completion of the calculation. Thus, in the example of FIG. 4B, the following functional units are usable: three memory read functional units 1400$h$, 1400$h'$, 1400$h''$ (each of which may, for example, preferably be identically designed, in particular, completely as hardware circuits), two multiplication functional units 1400$i$, 1400$i'$ (each of which may, for example, preferably be identically designed, in particular, completely as hardware circuits), one memory write functional unit 1400k as well as one data flow control unit 140b.

If, for example, a partial algorithm must be initially ended before the next one starts and/or if, for example, a sufficient number of functional units is not available for the required calculations, the algorithm described above with reference to FIG. 4B may, according to other specific embodiments, advantageously also be separated into partial algorithms, as this is described below by way of example with reference to FIG. 4C.

Figure 4C:
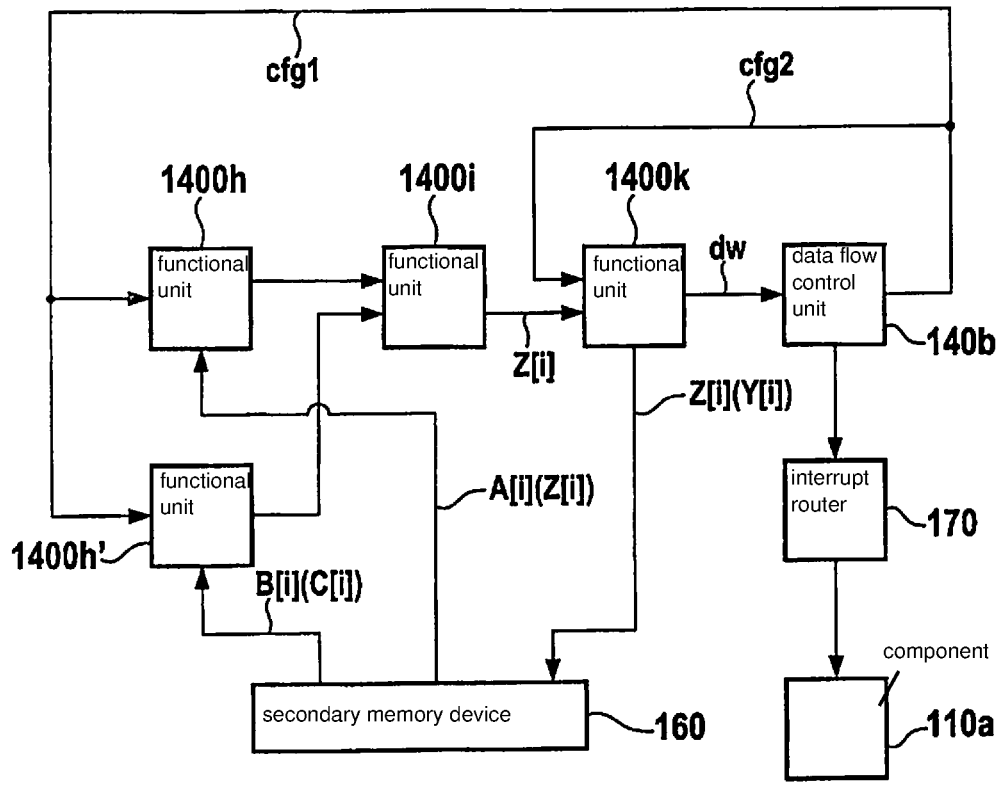

According to FIG. 4C, partial algorithm Z[i]=A[i]* B[i] is initially calculated, thereafter partial algorithm Y[i]=Z[i]*C[i]. For this purpose, the two memory read functional units 1400h, 1400h' are utilized, which read vectors A[i] and B[i] from secondary memory device 160 and then send these to multiplication functional unit 1400i. The result Z[i]=A[i]*B[i] thereof is sent to memory write functional unit 1400k, which stores result Z[i] in secondary memory device 160. After the last data word is written, memory write functional unit 1400k sends a corresponding data word dw to data flow control unit 140b. Data flow control unit 140b receives data word dw as input data, evaluates it, and then reconfigures the two memory read functional units 1400h, 1400h' and memory write functional unit 1400k using the principle according to the present invention, cf. arrows cfg1, cfg2. The reconfiguration ensures that memory read functional units 1400h, 1400h' now read vectors Z[i] and C[i] from secondary memory device 160 and memory write functional unit 1400k now writes vector Y[i]. The configuration of multiplication functional unit 1400i does not need to be changed in the present case. Once second partial algorithm Y[i] has also been calculated, similar to first partial algorithm Z[i], memory write functional unit 1400k sends a corresponding data word dw to data flow control unit 140b. As previously also in FIG. 4B, the data flow control unit then lastly sends, for example, an interrupt order to an interrupt order router device 170, as a result of which, in turn, a processing core 110a of the processing unit is notified of the completion of the calculation. Thus, in the example of FIG. 4C, the following functional units are usable: 2 memory read functional units 1400h, 1400h', one multiplication functional unit 1400i, one memory write functional unit 1400k, as well as a data flow control unit 140b. Thus, it is apparent that both a memory read functional unit as well as a multiplication functional unit are less required compared to FIG. 4B, the duration of the calculation increasing, however, since for one, not two but only one multiplication functional unit 1400i is simultaneously carried out or operated, and since for another, vector Z[i] is also stored in secondary memory device 160 and read from there.

Another significant advantage of the configuration according to the present invention is that the system resources required for the data exchange between the functional units are limited essentially to primary connection unit 150 (FIG. 1A), in particular, not including main connection unit 130. This advantageously enables an efficient communication of the additional components 110a, 110b, 110c, 120, 125a, 125b of processing unit 100 according to the present invention using main connection unit 130 essentially unburdened by the functional units, as well as an efficient and precise prediction of potential blocking states inside flexible hardware extension 1500 (FIG. 1A). Therefore, the risk of blockages during the data processing may advantageously also be reduced or ruled out by the processing unit according to the present invention using the principle according to the present invention.

In another advantageous specific embodiment, it is provided, as previously described repeatedly, that data is exchanged between various functional units 140, 140 A, 140 B, cf. FIG. 1A, via a primary connection unit 150, primary connection unit 150 being designed preferably as a crossbar switch, particularly preferably as a non-blocking crossbar switch. Primary connection unit 150 particularly advantageously enables multiple simultaneous or at least partially chronologically overlapping data transmissions between different functional units.

Alternatively or in addition to the provision of a crossbar switch, one or multiple directly hardwired data connections may be provided between various functional units. For example, it may be provided in one direct hardwiring between various functional units that one particular functional unit may select one or multiple or also all other functional units as a target ("target functional unit") for outputting output data such as, for example, data packets. A corresponding number of direct data connections are provided depending on the number of possible target functional units. An adaptation logic (glue logic), for example, including multiplexer structures or demultiplexer structures or the like, may optionally also be provided in one or in multiple such directly hardwired data connections. It is further possible for three separate output interfaces to be provided for a particular functional unit, which is intended to be able to output data packets to, for example, three possible target functional units, each of which is directly connected to a corresponding input interface of one of the possible target functional units.

In other specific embodiments, connection technologies more flexible than the aforementioned directly hardwired or directly nested data connections may be used. Examples of these are crossbar switches, bus systems and the like. Combinations of the aforementioned technologies are also possible.

In another particularly preferred specific embodiment, primary connection unit 150 is designed to modify a target address contained in data fed to it such as, for example, data packets, for example, by subtraction of an offset address of a target functional unit, in particular, before forwarding these data to the corresponding target functional unit, advantageously in such a way that the data packet to the receiving target functional unit includes merely a local address for the local configuration memory and/or for the local functional memory.

In another particularly preferred specific embodiment, a large number of identical or varying functional units may be combined with one another and may be data-connected to one another via a primary connection unit, as a result of which a form of a calculation network or a calculation device is obtained, which may be designed to calculate a particular algorithm. The calculation device may particularly preferably calculate algorithms, which exhibit a higher degree of complexity than algorithms that are calculatable by individual functional units that form components of the calculation device. Examples of such calculation devices were previously already described, for example, with reference to FIG. 1A, 1B, 1C 4. "Flexible hardware extension" 1500 from FIG. 1A, in particular, represents such a calculation device, as does additional flexible hardware extension 1500a from FIG. 1B or also each of groups G1, G2 from FIG. 1C.

In one preferred specific embodiment, a calculation algorithm of the calculation network enabled according to the present invention is characterized by one or multiple of the following aspects: the specific functionality of each functional unit involved, the specific possibilities of the configurability of each functional unit involved, in particular, with respect to its (calculation) functionality, the specific connectivity or connectability of each functional unit involved in relation to the establishment of data connections to other functional units or to the primary connection unit, the establishment of data connections via different interfaces a24, the establishment of data connections a34 to external components 200, the specific capabilities and possibilities of each functional unit involved for configuring or reconfiguring with respect to the connectivity with other functional units or with the primary connection unit, the initial functional configuration of each functional unit involved, the initial configuration of the connectivity or connection of each functional unit involved with respect to the establishment of data connections to other functional units or to the primary connection unit, the initial configuration for establishing data connections via different interfaces a24, the initial configuration for establishing data connections a34 to external components 200, the specific dynamic reconfiguration of each functional unit involved during the runtime with respect to their functionality (for example properties of local calculation unit 1420), the specific dynamic (during the runtime of the functional unit) reconfiguration of each functional unit involved with respect to its connectivity to other functional units or to the primary connection unit, the specific dynamic configuration for establishing data connections via different interfaces a24, the specific dynamic configuration for establishing data connections a34 to external components 200, an output configuration at the beginning of the runtime of the functional units involved, input data, events which may influence the calculation results or a configuration of at least one functional unit involved or of the primary connection unit.

In another particularly preferred specific embodiment, at least one of the functional units is designed to configure or reconfigure itself or another functional unit, in particular, dynamically, i.e. during the runtime of one functional unit or of the other functional unit. This eliminates the requirement of the configuration by an external component. In other words, no external component is required in this specific embodiment in order to configure or reconfigure functional units according to the present invention.

In other specific embodiments, it may be provided, however, that at least one other component of processing unit 100 according to the present invention, for example, a processing core 110*a*, or also one of peripheral components 125*a*, 125*b* is designed to configure or reconfigure at least one of the functional units according to the present invention.

Another advantage of the functional units according to the present invention is the high degree of "distributed intelligence" or processing capacity and flexibility that results from the functionality, for example, of the individual local calculation units, from their flexible configurability and reconfigurability. These advantages scale particularly advantageously with the number of functional units of a processing unit according to the present invention. Such a functionality and flexibility cannot be economically implemented with, for example, only one central superordinate unit, as it is conventional. A significant advantage of the present invention is the multitude of possibilities with respect to the preparation and (dynamic) change of data paths or linking of the functional units among themselves, which is enabled, for example, by the use of corresponding addresses in data packets exchanged between the functional units. Another advantage is the high degree of parallelism resulting from the fact that functional units may be operated algorithmically independently of one another. Another advantage is the high degree of parallelism resulting from the fact that functional units may be operated algorithmically independent of one another in a functional units overarching pipeline.

According to the present invention, it has been found that the more data packets that are transmitted, the more functional units operate in parallel, the target address of individual data packets according to preferred specific embodiments also being capable of changing between two successive transmissions of data packets. A particularly large number of data packets, in particular, may also be transmitted simultaneously by the primary connection unit or conveyed to target functional units, because the functional units themselves according to the present invention are designed to specify according to the target addresses.

In another preferred specific embodiment, all components of the processing unit according to the present invention are situated on one and the same semiconductor substrate or are manufactured using the same semiconductor manufacturing technology.

Functional units 140, 140*a*, 140*b*, . . . , 140*q*; 1400, 1400*a*, 1400*b*, . . . , 1400*g* according to the present invention are advantageously also situated on the same semiconductor substrate as the other components 110*a*, 110*b*, 110*c*, 120, 125*a*, 125*b*, 130 of the processing unit. This results advantageously in a particularly compact configuration as well as in the possibility of manufacturing an efficient and high-performance data connection between the components, for example, including main connection unit 130 and at least one primary connection unit 150.

Figure 6:
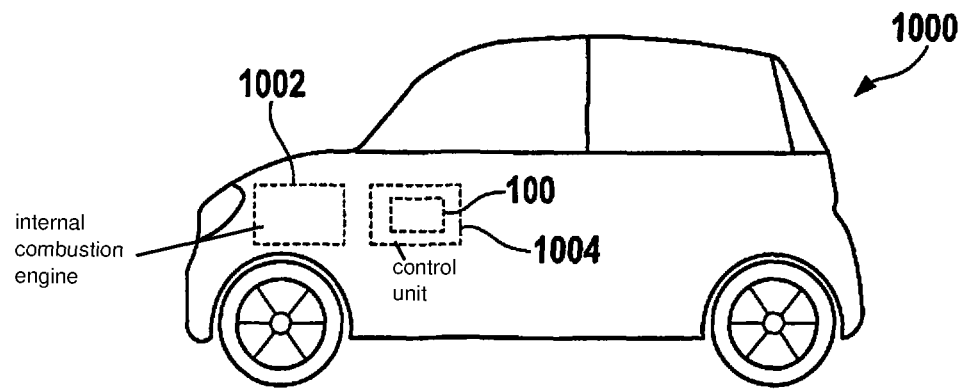
FIG. 6 shows an operation scenario according to one specific embodiment.

FIG. 6 schematically shows an operating scenario of a processing unit 100 according to the present invention. Processing unit 100 is part of a control unit 1004 for an internal combustion engine 1002 of a motor vehicle 1000. Processing unit 100 includes, for example, a configuration as described above with reference to FIGS. 1A through 1G, and at least two functional units 140, 1400, as they were described above, for example, with reference to the FIGS. 1A through 2C. Processing unit 100 according to the present invention exhibits a particularly high degree of flexibility, because the functional units contained therein may be dynamically configured or reconfigured. At the same time, an extension of the processing power of processing unit 100 advantageously exists beyond the processing power of its processing cores 110*a*, 110*b*, 110*c* and other peripheral components 125 as a result of the functional units according to the present invention.

Additional advantageous fields of applications for the principle according to the present invention and the processing unit according to the present invention are control units for the operation of electric motors or generators, control units for batteries, driver assistance systems, chassis systems, power tools, household appliances and the like.

Additional advantageous specific embodiments and aspects of the present invention are described below.

In one particularly preferred specific embodiment, multiple functional units 1400 (FIG. 2A) are connected to one another by at least one connection structure establishing data connections, in particular, primary connection unit 150 (FIG. 1A), i.e., for example, a crossbar switch and/or a bus system and the like, in such a way that a comprehensive data flow is formed, which enables the calculation of a specific algorithm or also the calculation of multiple specific algorithms in parallel.

In other specific embodiments, at least some of these data connections are particularly preferably dynamically reconfigurable, so that the algorithm is also dynamically changeable. This may take place, as already described above, for example, by a corresponding addressing of data packets exchanged between the functional units involved.

In other specific embodiments, this may, for example, in the case of direct data connections between functional units, cf. reference numeral 152c from FIG. 1A, be implemented using multiplexer structures or demultiplexer structures, which adapt direct data connections 152c to the modifications of the relevant algorithm to be made using a corresponding control.

In preferred specific embodiments, primary connection unit 150 exhibits a high degree of parallelism, as a result of which many simultaneous or chronologically overlapping data connections or data transmissions are enabled between different functional units.

A higher data throughput and a high processing power in the data processing by the functional units according to the present invention may be further advantageously achieved according to one specific embodiment, in that the functional units forward their output data among themselves, preferably writing, in particular only writing, which creates a streaming mechanism. Undesirable interrupts in the data flow may, in particular, also be avoided as a result.

Particularly preferably, no central control of a data flow for the data processing is provided by the functional units according to the present invention, as is common in conventional microcontrollers, for example, in the form of a processing core. Instead, the data flow for the data processing by the functional units according to the present invention is determined in preferred specific embodiments of the present invention exclusively by the functional units themselves, preferably by at least one data flow control unit 140b (FIG. 1A). In this case, primary connection unit 150 (FIG. 1A), in particular, is switched or controlled, for example, directly and/or, for example, according to a configuration of a functional unit 140b, in such a way that the output data of a functional unit are sent to a configured target functional unit. In some specific embodiments, this may be set in each case, for example, for a particular period of time, in particular until the renewed configuration or reconfiguration of primary connection unit 150. However, this may also be effectuated in some specific embodiments, for example, in that at least some, preferably however all, data packets sent by functional units are provided with a target address, which indicates, for example, the target functional unit for a data transmission, optionally also a target memory area or a target memory cell or the like in a local address space of the target functional unit. Details in this regard were already described above with reference to data structure DS according to FIG. 2A.

In another specific embodiment, it is provided that a functional unit carries out an operation or calculation task (only) if the configured input data are available. If, for example, the local calculation unit of a functional unit as a multiplication accumulator (MAC) according to the following equation O=A*B+C is configured only for the calculation type "multiplication", it is sufficient if the two input values A, B are present so that the relevant functional unit or its local calculation unit may start the calculation. In contrast, the functional unit or its local calculation unit would also have to wait for the presence of additional input value C if the functional unit or its local calculation unit is configured for the calculation types "multiplication" and "addition", i.e., a complete multiplication accumulation.

In another specific embodiment, it is provided that a functional unit is flexibly designed, for example, with respect to the functionality of its local calculation unit, in such a way that it is selectively useable, for example, as a function of a configuration, for various types or variants of a corresponding calculation task. For example, an adder of a local calculation unit may be preferably designed in such a way that instead of the addition, it is also able to carry out a subtraction, the different functionality or a switch between these functionalities being settable with the aid of a configuration. It may also be configurable in the case of the adder whether the addition is carried out with "carry", with or without an accumulation register, and the like.

In another specific embodiment, optionally at least one, preferably multiple, configurable offset registers may be provided in a functional unit, which is configured for uploading data and/or for storing data. This at least one offset is changed in a fixed or preferably configurable manner with each data access operation, for example, incrementally, decrementally with a value greater than, smaller than or equal to 0, as a shift operation by N bits to the left or right, a resetting to 0 or to another value, as a so-called "bit-reverse", (higher-order bits are reflected on lower-order bits and vice versa), etc. Optionally present, at least two offsets may particularly preferably be configurably set as a function of each other and/or independently, so that, for example, a first offset changes with each data access and a second offset, for example, changes only if the first offset has carried out a particular number of accesses. One functional unit for uploading and/or for storing data particularly preferably has a preferably configurable integrated unit for type conversion, in particular, of floating-point numbers into fixed-point numbers and vice versa and/or for adapting bit widths, for example, from 16 bits to 32 bits, and so forth.

In another advantageous specific embodiment, a functional unit 1400e (FIG. 4) may be designed to take parameters of an algorithmic loop into account. Functional unit 1400e may, in particular, be designed to output an instantaneous loop depth of a considered arithmetic operation to downstream functional units 1400f, for example, in the form of control data CTRL, cf. data structure DS from FIG. 2A, whereupon at least one functional unit 1400f receiving such data may, for example, carry out a conditional execution of calculation steps provided by its local calculation unit 1420 as a function of the loop depth communicated by upstream functional unit 1400e.

In another advantageous specific embodiment, a functional unit may be designed to ascertain pieces of information relating to a beginning and/or to an end of at least one algorithmic loop (or multiple loop levels, "first transfer/last transfer"). The functional unit may, for example, control the operation of its own local calculation unit 1410 as a function of the pieces of information thus ascertained.

In another advantageous specific embodiment, a functional unit may be designed to transmit previously ascertained pieces of information relating to a beginning and/or to an end of at least one algorithmic loop to at least one additional (target) functional unit. The (target) functional unit, in turn, may advantageously carry out a conditional execution of calculation tasks, for example, as a function of the received pieces of information. According to one specific embodiment, for example, an accumulation of data in one functional unit is considered for this purpose, which is designed to carry out the arithmetic operation "addition". In a loop start, the accumulator register is reset, during execution of the loop, an accumulation takes place (this means, successive pieces of input data are continually added during the loop and temporarily stored in the accumulator register), and at the end of the loop, in particular, only then, are the accumulated data forwarded as output data, for example, to a downstream functional unit.

In another advantageous specific embodiment, a functional unit may be designed to carry out an internal reconfiguration, advantageously according to equally configurable specifications, based on the ascertained pieces of information relating to the beginning and/or to the end of at least one algorithmic loop inside or outside the same functional unit, so that, for example, the calculated function is changed. For example, a multiplication accumulator is reconfigured at the end of an ascertained loop into a simple multiplier, i.e., without further addition.

In another advantageous specific embodiment, it is provided that one or multiple configuration registers 1432a, 1432b, 1432c, 1432d (FIG. 2A) of functional unit 1400 are directly or indirectly mapped into other registers of processing unit 100 according to the present invention (FIG. 1A), for example, in superordinate peripheral registers inside flexible hardware extension 1500 and/or outside flexible hardware extension 1500, for example, into an additional peripheral component 125 or into an external component 200. In this way, other components of processing unit 100 according to the present invention such as, for example, processing core 110a, may efficiently access the configuration register or configuration registers of functional unit 1400.

Additional advantageous specific embodiments of the present invention, the benefits thereof and preferred exemplary applications are specified below.

Processing unit 100 according to the present invention advantageously enables the efficient execution of processing-intensive and complex mathematical calculations (in particular, with great (processing) depth, numerous arithmetic operations), without the need for special acceleration hardware for such purpose, such as, for example the use of multiple digital signal processors (DSP) or ASICs, in addition to a conventional microcontroller or integrated into a microcontroller or the like. Instead, the processing-intensive and complex mathematical calculations may be advantageously carried out by functional units 140, . . . , 1400 according to the present invention, which are also flexibly connectable among themselves, as a result of which a simple adaptation of processing unit 100 according to the present invention to diverse processing-intensive and complex mathematical calculations or algorithms is possible. Processing unit 100 according to the present invention may, for example, be advantageously used for processing sensor values, for example in a control unit of a motor vehicle.

In one preferred specific embodiment, an exemplary data processing chain results as follows: a sensor signal (for example, of a rotational speed sensor) forms input data for processing unit 100, calculations inside a processing core 110a of processing unit 100, additional calculations by functional units 140 according to the present invention, renewed calculations by processing core 110a, generation of a control signal as an output signal of processing unit 100 for downstream systems such as, for example, actuators or output stages for activating actuators.

In other specific embodiments, other sequences of the aforementioned elements of an exemplary data processing chain may also result. For example, the functional units according to the present invention, instead of processing core 110a, may also be directly at the beginning of the data processing chain or also at the very end of the data processing chain. In other specific embodiments, instead of a sensor signal, multiple input variables and/or multiple output variables are also possible.

In general, the application of the principle according to the present invention, which is based on the provision of multiple functional units, enables an unburdening of processing cores 110a, 110b, 110c of processing unit 100. A pipeline of the calculation unit represented by the functional units is particularly preferably filled and operates (massively) in parallel, which makes a very rapid calculation possible.

Because of its power efficiency, the processing unit according to the present invention is suitable, in particular, for control units for internal combustion engines, in particular, of motor vehicles, in which a number of input values such as, for example, sensor signals are subjected to a complex processing, in order for corresponding output signals for actuators such as, for example, magnetically-actuated or piezoelectrically-actuated injection valves for a fuel injection system of the internal combustion engine.

The processing unit according to the present invention may further be advantageously used in control units for driver assistance systems, for example, for evaluating radar data for controlling driver assistance functions, in which conventional control units typically include multiple digital signal processors in order to be able to process the accruing volumes of data of the radar sensor system.

The processing unit according to the present invention that includes the flexible hardware extension may further be advantageously used in control units, in which complex, control-oriented models are calculated and/or in which a complex digital signal processing takes place.

In addition to the calculation possibilities already described above, which may be implemented by individual functional units 1400 (FIG. 2A) or by a combination of individual functional units, in particular by their respective local calculation unit(s) 1420, it is equally possible to provide the following functionalities via one or multiple functional units according to the present invention in combination, if in a corresponding expansion stage of flexible hardware extension 1500, the required basic functionalities are even present in the form of functional units, including calculation units and, in addition, in the required number, configuration and connection among themselves are present, and permit a calculation with the required total processing power: calculation of (also high-dimensional) characteristic diagrams (for example, having more than five dimensions), calculation of data-based models, calculation of physical models, calculation of neuronal networks, solving of linear equation systems, formation of inverse matrices (in particular, higher-order matrices), solving of non-linear equation systems, time-to-frequency conversion, for example, through calculation of the Fast Fourier Transformation (FFT), frequency-to-time conversion, for example, through calculation of the inverse Fast Fourier Transformation (IFFT), calculation of various filter types such as FIR (Finite Impulse Response), IIR (Infinite Impulse Response), etc.

Figure 7:
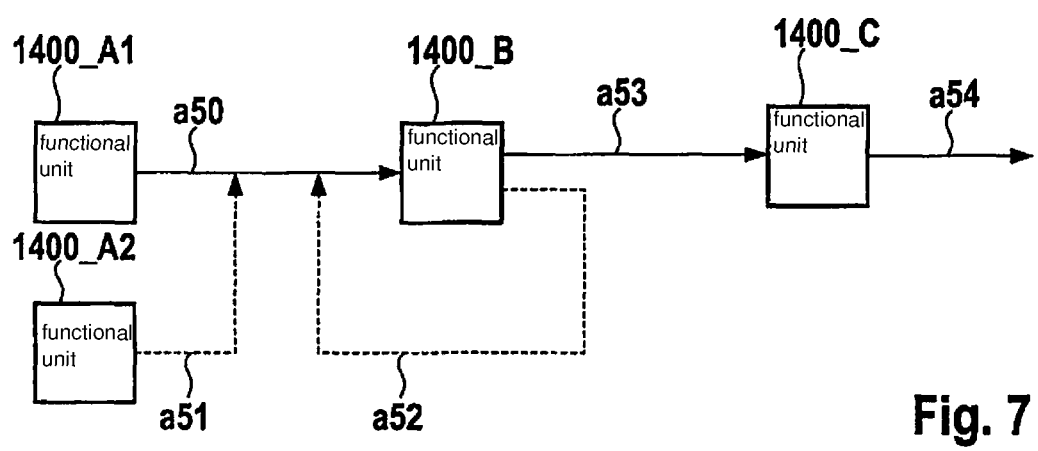
FIG. 7 schematically shows a simplified data flow of one specific embodiment.

FIG. 7 schematically shows a simplified data flow according to another specific embodiment, in which, by way of example, a total of four functional units 1400_A1, 1400_A2, 1400_B, 1400_C are depicted. One possible data flow from functional unit 1400_A1 to functional unit 1400_B is marked by arrow a50. One possible data flow from functional unit 1400_A2 to functional unit 1400_B is marked by arrow a51. One possible data flow from functional unit 1400_B to itself (enables recursion) is marked by arrow a52. One possible data flow from functional unit 1400_B to functional unit 1400_C is marked by arrow a53. Output data of functional unit 1400_C are marked by arrow a54.

As is apparent from FIG. 7, data from the two various functional units 1400_A1, 1400_A2 may be fed on the input side to functional unit 1400_B. Functional unit 1400_B may be designed, for example, to accept data a50 from first functional unit 1400_A1, whereas data a51 from second functional unit 1400_A2, however, are not already accepted. Functional unit 1400_B may further be designed to accept data a51 from second functional unit 1400_A2, whereas data a50 from first functional unit 1400_A1, however, are not already accepted. Functional unit 1400_B may further be designed to accept data from itself via recursion branch a52, whereas data a50, a51 from functional units 1400_A1, 1400_A2, however, are not already accepted. Other configurations for controlling the data flow between the functional units are also possible according to other specific embodiments. In other specific embodiments, the simultaneous reception of data or pieces of information from more than one functional unit 1400_A1, 1400_A2 or by recursion from 1400_B to itself is, in particular, also possible.

What is claimed is:

1. A processing unit, comprising:
   at least one processing core;
   a primary memory device;
   at least one main connection unit for connecting at least one processing core to the primary memory device;
   a plurality of functional units separate from the at least one processing core, at least one first functional unit of the plurality of functional units being configured to output first data including a target address of at least one additional functional unit of the plurality of functional units in order to send the first data to the at least one additional functional unit of the plurality of functional units; the plurality of functional units also including at least one functional unit configured as a data flow control unit, which is configured to receive input data, to evaluate the input data, to generate output data as a function of the evaluation, and to send an interrupt order to an interrupt order router device for notification of the at least one processing core of completion of a calculation;
   at least one primary connection unit configured to establish at least temporarily a direct data connection between the first functional unit and at least one additional functional unit in order to send the first data from the first functional unit to the at least one additional functional unit based on the address of at least one additional functional unit in the first data, the at least one primary connection unit being separate from the at least one processing core, primary memory device and at least one main connection; and
   at least one secondary memory device separate from the primary memory device, the at least one secondary memory device configured to have a direct data connection to at least one of the plurality of functional units.

2. The processing unit as recited in claim 1, wherein the processing unit is a microcontroller for a control unit.

3. The processing unit as recited in claim 1, wherein the primary connection unit includes at least one of the following components: a crossbar switch, a bus system, or at least one direct data connection between at least two functional units.

4. The processing unit as recited in claim 1, wherein at least one secondary connection unit is provided, which is designed to at least one of: establish a data connection between the main connection unit and at least one functional unit, or establish a data connection between the main connection unit and at least one primary connection unit.

5. The processing unit as recited in claim 1, wherein the data flow control unit is configured to control at least one data flow at least one of: between functional units, or between functional units and additional components of the processing unit; the controlling as a function of the output data.

6. The processing unit as recited in claim 1, wherein the data flow control unit is designed to subject the input data to a comparison with target data and to generate the output data as a function of the comparison.

7. The processing unit as recited in claim 1, wherein the data flow control unit includes an evaluation unit which at least one of: evaluates the input data, or generates the output data as a function of the evaluation.

8. The processing unit as recited in claim 1, wherein the data flow control unit is designed to control an operation of multiple functional units of the processing unit.

9. The processing unit as recited in claim 1, wherein the data flow control unit is designed to exchange at least one of algorithmic data or control data, with at least one of: at least one external component, at least one peripheral component, or at least one interrupt order router device.

10. The processing unit as recited in claim 1, wherein the data flow control unit is designed to wait for predefinable input data or control data to synchronize its operation with at least one other component of the processing unit.

11. The processing unit as recited in claim 1, wherein the data flow control unit is designed to control calculations of data by at least one other functional unit to manage counters for the calculation, wherein the calculation is at least one of: iterative, or recursive.

12. The processing unit as recited in claim 1, wherein the data flow control unit at least one of: is configurable, configures at least one other functional unit, or is designed to access a memory device.

13. The processing unit as recited in claim 1, wherein the data flow control unit is completely a hardware circuit.

14. The processing unit as recited in claim 1, further comprising a single integrated circuit substrate including the at least one processing core, primary memory device, at least one main connection unit, plurality of functional units, and at least one primary connection unit.

15. The processing unit as recited in claim 1, wherein the first data also includes a target memory address in a local address space of the at least one additional functional unit.

16. The processing unit as recited in claim 1, wherein the first functional unit of the plurality of functional units is configured to receive second data from at least one further functional unit of the plurality of functional units.

17. The processing unit as recited in claim 1, further comprising a bus system connecting the at least one secondary memory device and the plurality of functional units.

18. The processing unit as recited in claim 1, wherein the secondary memory device includes multiple memory banks, and is configured to enable a parallel data access to at least two of the multiple memory banks.

19. The processing unit as recited in claim 17, wherein the bus system is coupled via a bus coupling unit to the main connection unit.

20. The processing unit as recited in claim 19, wherein memory areas of the secondary memory device are visible in a global address space of the processing unit.

21. The processing unit as recited in claim 1, wherein at least one of the plurality of functional units includes a reconfiguration device configured to reconfigure the functionality of the at least one of the plurality of functional units during operation of the at least one of the plurality of functional units.

22. The processing unit as recited in claim 21, wherein the reconfiguration device is configured to reconfigure the at least one of the plurality of functional units in response to a signal from the data flow control unit.

23. A control unit for an internal combustion engine of a motor vehicle, the control unit including at least one processing unit, the processing unit comprising:
   at least one processing core;
   a primary memory device;
   at least one main connection unit for connecting at least one processing core to the primary memory device;
   a plurality of functional units separate from the at least one processing core, at least one first functional unit of the plurality of functional units being configured to output first data including a target address of at least one additional functional unit of the plurality of functional units in order to send the first data to the at least one additional functional unit of the plurality of functional units; the plurality of functional units also including at least one functional unit configured as a data flow control unit, which is configured to receive input data, to evaluate the input data, to generate output data as a function of the evaluation, and to send an interrupt order to an interrupt order router device for notification of the at least one processing core of completion of a calculation;
   at least one primary connection unit configured to establish at least temporarily a direct data connection between the first functional unit and at least one additional functional unit in order to send the first data from the first functional unit to the at least one additional functional unit based on the address of at least one additional functional unit in the first data, the at least one primary connection unit being separate from the at least one processing core, primary memory device and at least one main connection; and
   at least one secondary memory device separate from the primary memory device, the at least one secondary memory device configured to have a direct data connection to at least one of the plurality of functional units.

24. A method for operating a processing unit, the method comprising:
   providing the processing unit, the processing unit including at least one processing core, a primary memory device, at least one main connection unit for connecting the at least one processing core to the primary memory device, a plurality of functional units separate from the at least one processing core, at least one primary connection unit, and at least one secondary memory device; wherein:
      at least one first functional unit of the plurality of functional units outputs first data including a target address of at least one additional functional unit of the plurality of functional units in order to send the first data to at least one additional functional unit of the plurality of functional units;
      the plurality of functional units also including at least one functional unit configured as a data flow control unit, the data flow control unit being configured to receive input data, to evaluate the input data, and to generate output data as a function of the evaluation, and to send an interrupt order to an interrupt order router device for notification of the at least one processing core of completion of a calculation;
      the at least one primary connection unit being configured to establish at least temporarily a direct data connection between the first functional unit and the at least one additional functional unit in order to send the first data from the first functional unit to the at least one additional functional unit based on the address of at least one additional functional unit in the first data, the at least one primary connection unit being separate from the at least one processing core, primary memory device and at least one main connection; and
      the at least one secondary memory device is separate from the primary memory device, the at least one secondary memory device configured to have a direct data connection to at least one of the plurality of functional units; and
   operating the processing unit.

25. The method as recited in claim 24, wherein the processing unit is a microcontroller for a control unit.

* * * * *